(12) United States Patent
Haynes et al.

(10) Patent No.: US 7,489,803 B2
(45) Date of Patent: Feb. 10, 2009

(54) OBJECT DETECTION

(75) Inventors: Simon Dominic Haynes, Basingstoke (GB); Jonathan Living, Nr. Stourbridge (GB)

(73) Assignee: Sony United Kingdom Limited, Weybridge (GB)

( * ) Notice: Subject to any disclaimer, the term of this patent is extended or adjusted under 35 U.S.C. 154(b) by 677 days.

(21) Appl. No.: 11/007,097

(22) Filed: Dec. 8, 2004

(65) Prior Publication Data
US 2005/0129311 A1    Jun. 16, 2005

(30) Foreign Application Priority Data
Dec. 11, 2003    (GB)    ................. 0328736.4

(51) Int. Cl.
  G06K 9/00    (2006.01)
  H04N 5/235   (2006.01)
(52) U.S. Cl. ............. 382/103; 382/291; 348/222.1
(58) Field of Classification Search ......... 382/100, 382/103, 104, 106, 107, 123, 115–118, 154, 382/155, 168, 172, 181, 203, 190–195, 209, 382/232, 254, 274, 276, 285–291, 305, 312, 382/219; 348/222.1; 345/419
See application file for complete search history.

(56) References Cited

U.S. PATENT DOCUMENTS 6,496,184 B1 *  12/2002  Freeman et al. ............. 345/419
6,681,032 B2 *   1/2004  Bortolussi et al. ........... 382/118
6,829,384 B2 *  12/2004  Schneiderman et al. ..... 382/154
6,940,545 B1 *   9/2005  Ray et al. ................. 348/222.1
7,130,454 B1 *  10/2006  Berube et al. ............... 382/118

(Continued)

FOREIGN PATENT DOCUMENTS

EP    0 682 325    3/1997

(Continued)

OTHER PUBLICATIONS

Schneiderman H et al: "A histogram-based method for detection of faces and cars" Image Processing, 2000. Proceedings. 2000 International Conference on Sep. 10-13, 2000, Piscataway, NJ, USA,IEEE, vol. 3, Sep. 10, 2000, pp. 504-507, XP010529514 ISBN: 0-7803-6297-7.

(Continued)

Primary Examiner—Seyed Azarian
(74) Attorney, Agent, or Firm—Oblon, Spivak, McClelland, Maier & Neustadt, P.C.

(57) ABSTRACT

Object detection apparatus for detecting objects in a test image comprises means for comparing blocks of a test window of the image with reference data indicative of the presence of an object to generate index figures indicative of a degree of similarity between a region and the reference data; means for storing probability data corresponding to possible values of the index figure and the block position; means operable, in respect of a current block, for accessing a probability value from the storing means in dependence on that block's position within the test window and the index figure generated in respect of that block; and means for combining the probability values corresponding to blocks in a test window to generate a result indicative of the probability of that test window containing an object; in which the probability values in the storing means are ordered by block position then by index figure.

20 Claims, 21 Drawing Sheets

U.S. PATENT DOCUMENTS

| | | |
|---|---|---|
| 7,194,114 B2 * | 3/2007 | Schneiderman ............. 382/118 |
| 2003/0190076 A1 | 10/2003 | DeLean |
| 2003/0215134 A1 | 11/2003 | Krumm |

FOREIGN PATENT DOCUMENTS

| | | |
|---|---|---|
| EP | 1 353 516 | 10/2003 |

OTHER PUBLICATIONS

Heisele B et al: "Face recognition: component-based versus global approaches" Computer Vision and Image Understanding Academic Press USA, vol. 91, No. 1-2, Jul. 2003, pp. 6-21, XP002319296 ISSN: 1077-3142.

Chin-Chen Chang et al.: "A color Image Retrieval Method Based on Local Histogram" PROC IEEE Pacific Rim Conf. on Multimedia Information Processing PCM2001, 2001, pp. 831-836, XP002319297.

Bileschi S M et al: "Advances in component-based face detection" Pattern Recognition With Support Vector Machines. First International Workshop, SVM 2002. Proceedings (Lecture Notes in Computer Science vol. 2388) Springer-Verlag Berlin, Germany, 2002, pp. 135-143, XP002319298 ISBN: 3-540-44016-X.

Henry Schneiderman et al., "A Statistical Method for 3D Object Detection Applied to Faces and Cars", IEEE Conference on Computer Vision and Pattern Detection, 2000.

Henry Schneiderman et al.. "Probabilistic Modeling of Local Appearance and Spatial Relationships for Object Recognition", IEEE Conference on Computer Vision and Pattern Detection, 1998.

Henry Schneiderman, "A Statistical Approach to 3D Object Detection Applied to Faces and Cars", phD thesis, Robotics Institute, Carnegie Mellon University, pp. 1-100, May 10, 2000.

Erik Hjelmas et al., "Face Detection: A Survey", Computer Vision and Image Understanding, No. 83, pp. 236-274, 2001.

Ming-Hsuan Yang et al, "Detecting Faces in Images: A Survey", IEEE Transactions on Pattern Analysis and Machine Intelligence, vol. 24, No. 1, pp. 34-58, Jan. 2002.

* cited by examiner

| $F^{38}_{0,0,0}$ | $F^{38}_{1,0,0}$ | $F^{38}_{2,0,0}$ | ... | $F^{38}_{0,1,0}$ | $F^{38}_{1,1,0}$ | $F^{38}_{2,1,0}$ | ... | $F^{38}_{0,2,0}$ | $F^{38}_{1,2,0}$ | $F^{38}_{2,2,0}$ | ... | $F^{38}_{0,0,1}$ |
|---|---|---|---|---|---|---|---|---|---|---|---|---|
| $F^{38}_{1,0,1}$ | $F^{38}_{2,0,1}$ | ... | $L^{38}_{0,0,0}$ | $L^{38}_{1,0,0}$ | $L^{38}_{2,0,0}$ | ... | $R^{38}_{0,0,0}$ | $R^{38}_{1,0,0}$ | $R^{38}_{2,0,0}$ | ... | $F^{22}_{0,0,0}$ | $F^{22}_{1,0,0}$ |
| $F^{22}_{2,0,0}$ | | | | | | | | | | | | |

Fig. 13a

| $F^{38}_{0,0,0}$ | $L^{38}_{0,0,0}$ | $R^{38}_{0,0,0}$ | $F^{38}_{0,1,0}$ | $L^{38}_{0,1,0}$ | $R^{38}_{0,1,0}$ | $F^{38}_{0,2,0}$ | $L^{38}_{0,2,0}$ | $R^{38}_{0,2,0}$ | ... | $F^{38}_{0,0,1}$ | $L^{38}_{0,0,1}$ | $R^{38}_{0,0,1}$ |
|---|---|---|---|---|---|---|---|---|---|---|---|---|
| $F^{38}_{1,0,0}$ | $L^{38}_{1,0,0}$ | $R^{38}_{1,0,0}$ | ... | $F^{22}_{0,0,0}$ | $L^{22}_{0,0,0}$ | $R^{22}_{0,0,0}$ | | | | | | |

Fig. 13b

| 020 | 017 | 213 | 413 | 511 | 500 | 001 | 056 | 078 | 034 | 067 | 123 | 413 | 511 | 500 | 078 |
|---|---|---|---|---|---|---|---|---|---|---|---|---|---|---|---|
| 145 | 322 | 421 | 001 | 006 | 432 | 491 | 291 | 328 | 348 | 428 | 367 | 001 | 006 | 432 | 328 |
| 327 | 456 | 321 | 094 | 329 | 211 | 288 | 370 | 509 | 208 | 218 | 213 | 094 | 329 | 211 | 509 |
| 127 | 123 | 124 | 111 | 098 | 345 | 321 | 312 | 132 | 326 | 218 | 239 | 217 | 239 | 129 | 374 |
| 165 | 456 | 789 | 094 | 654 | 211 | 211 | 370 | 456 | 208 | 510 | 213 | 008 | 329 | 211 | 509 |
| 199 | 200 | 212 | 199 | 398 | 433 | 421 | 444 | 501 | 109 | 178 | 190 | 123 | 176 | 433 | 431 |
| 398 | 297 | 157 | 174 | 145 | 193 | 283 | 398 | 425 | 511 | 111 | 176 | 189 | 148 | 190 | 312 |
| 396 | 345 | 276 | 222 | 111 | 333 | 254 | 276 | 287 | 298 | 243 | 254 | 265 | 165 | 176 | 187 |
| 198 | 212 | 223 | 234 | 245 | 256 | 267 | 143 | 144 | 143 | 142 | 146 | 067 | 034 | 089 | 056 |
| 099 | 045 | 276 | 478 | 287 | 265 | 445 | 183 | 129 | 348 | 428 | 367 | 001 | 006 | 432 | 328 |
| 075 | 455 | 299 | 288 | 233 | 243 | 343 | 454 | 500 | 409 | 308 | 201 | 098 | 036 | 082 | 182 |
| 198 | 129 | 138 | 174 | 184 | 174 | 187 | 146 | 176 | 328 | 378 | 345 | 274 | 290 | 289 | 276 |
| 156 | 478 | 510 | 439 | 472 | 389 | 267 | 385 | 280 | 291 | 111 | 122 | 133 | 311 | 477 | 487 |
| 287 | 387 | 027 | 023 | 024 | 021 | 023 | 026 | 028 | 498 | 456 | 423 | 476 | 435 | 507 | 389 |
| 326 | 328 | 329 | 317 | 324 | 423 | 452 | 112 | 221 | 734 | 289 | 500 | 499 | 497 | 490 | 508 |

Fig. 14

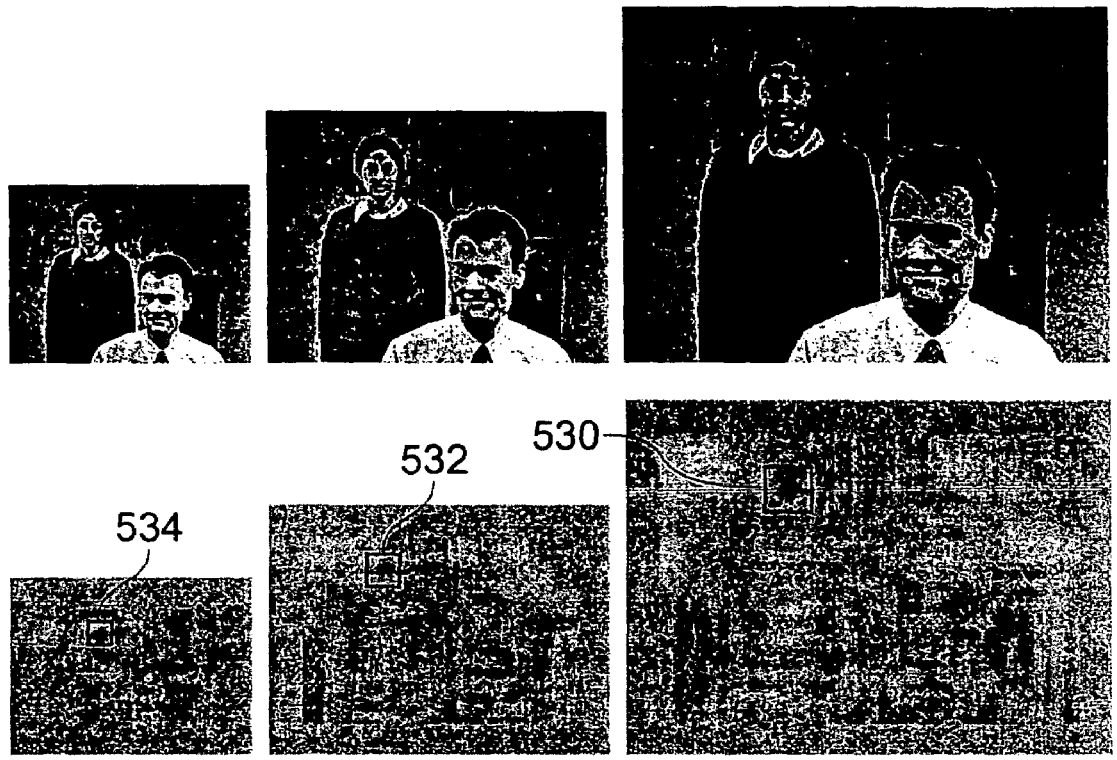
Fig. 15a     Fig. 15b     Fig. 15c

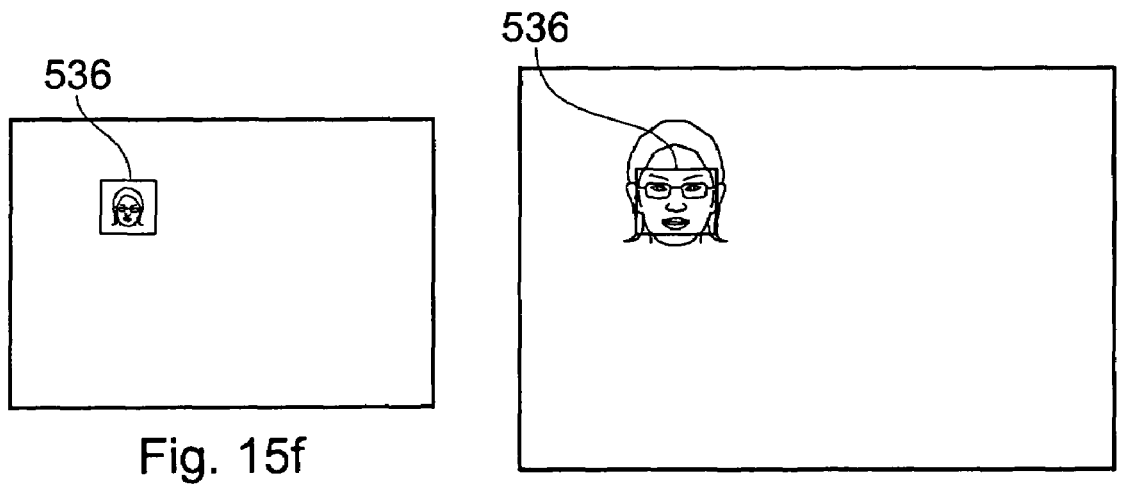
Fig. 15f
Fig. 15g

Fig. 20a 
Spatial factor of 1 (i.e. none)

Fig. 20b 
Spatial factor of 2

Fig. 20c 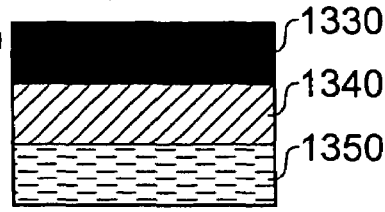
Spatial factor of 3

 Area used for face detection frame *n*

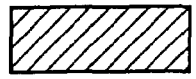 Area used for face detection frame *n+1*

 Area used for face detection frame *n+2*

Fig. 21a 
SparseX=2
SparseY=1
UseChequerBoard=0

Fig. 21b 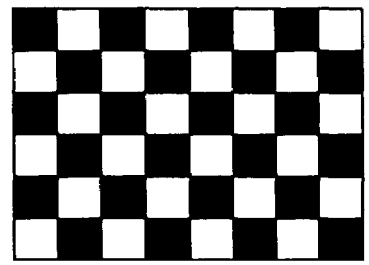
SparseX=2
SparseY=1
UseChequerBoard=1

Fig. 21c 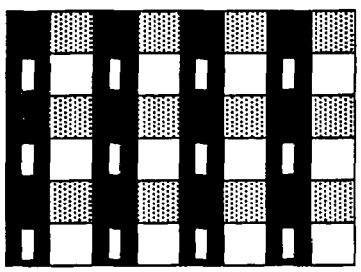
SparseX=2
SparseY=2
UseChequerBoard=0

Fig. 21d 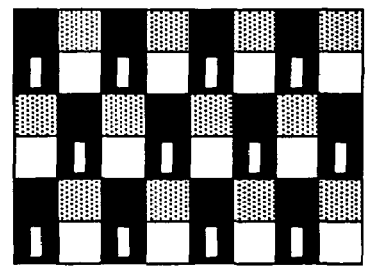
SparseX=2
SparseY=2
UseChequerBoard=1

■ Pixel used for face detection frame *n*
☐ Pixel used for face detection frame *n+1*
▨ Pixel used for face detection frame *n+2*
▥ Pixel used for face detection frame *n+3*

OBJECT DETECTION

BACKGROUND OF THE INVENTION

1. Field of the Invention

This invention relates to object detection.

2. Description of the Prior Art

The following description relates to a problem present in the detection of various types of objects, but will be discussed with respect to face detection for clarity of the description.

Many human-face detection algorithms have been proposed in the literature, including the use of so-called eigenfaces, face template matching, deformable template matching or neural network classification. None of these is perfect, and each generally has associated advantages and disadvantages. None gives an absolutely reliable indication that an image contains a face; on the contrary, they are all based upon a probabilistic assessment, based on a mathematical analysis of the image, of whether the image has at least a certain likelihood of containing a face. Depending on their application, the algorithms generally have the threshold likelihood value set quite high, to try to avoid false detections of faces.

Object detection tends to be very processor-intensive. In situations where object detection has to be carried out in real time, it can be difficult to complete all of the object detection processing in the time allowed—e.g. one frame period of a video signal.

SUMMARY OF THE INVENTION

This invention provides object detection apparatus for detecting objects in a test image, the apparatus comprising:

means for comparing blocks of a test window of the image with reference data indicative of the presence of an object to generate index figures indicative of a degree of similarity between a region and the reference data;

means for storing probability data corresponding to possible values of the index figure and the block position;

means operable, in respect of a current block, for accessing a probability value from the storing means in dependence on that block's position within the test window and the index figure generated in respect of that block; and means for combining the probability values corresponding to blocks in a test window to generate a result indicative of the probability of that test window containing an object;

in which the probability values in the storing means are ordered by block position then by index figure.

The invention involves the recognition of which values are accessed next to one another in an object detection process, with these values being ordered next to or near to one another to improve the efficiency of the data accessing process.

Various further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 13a and 13b schematically illustrate the data structure of the histograms;

FIG. 14 schematically illustrates a so-called bin map with a face window overlaid;

FIGS. 15a to 15g schematically illustrate so-called multiscale face detection;

FIGS. 20a to 20c schematically illustrate a spatial decimation technique;

FIGS. 21a to 21d schematically illustrate another spatial decimation technique;

DESCRIPTION OF THE PREFERRED EMBODIMENTS

The embodiments will be described with respect to face detection, but are equally applicable to a detection of other objects such as cars, by training with training images representing the required objects.

Figure 1:
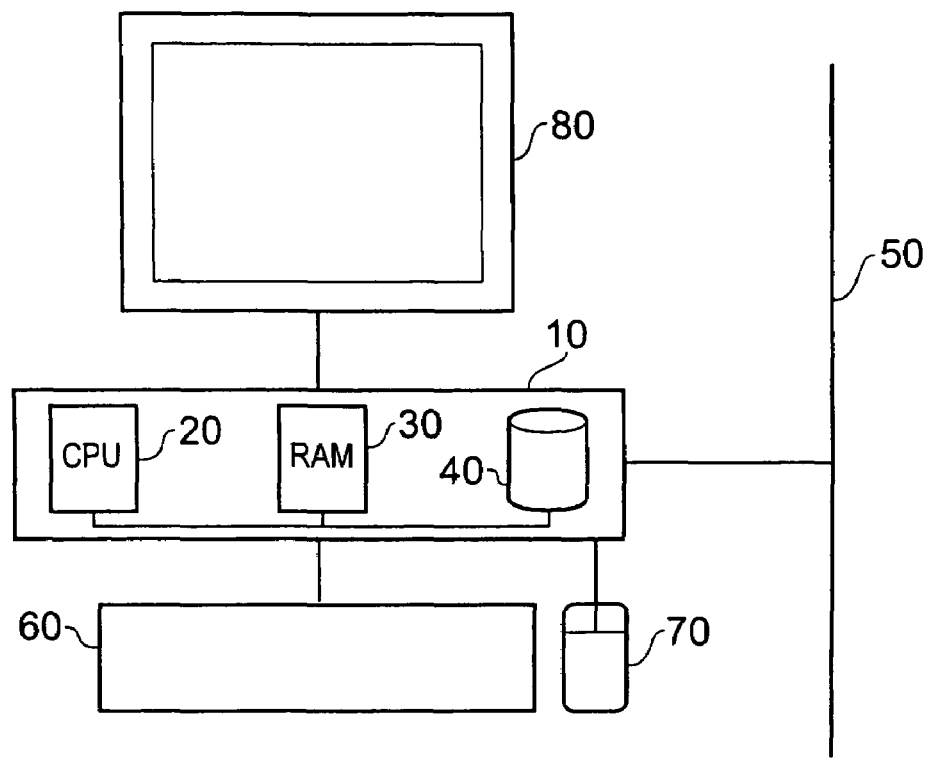
FIG. 1 is a schematic diagram of a general purpose computer system for use as a face detection system and/or a non-linear editing system.

FIG. 1 is a schematic diagram of a general purpose computer system for use as a face detection system and/or a non-linear editing system. The computer system comprises a processing unit 10 having (amongst other conventional components) a central processing unit (CPU) 20, memory such as a random access memory (RAM) 30 and non-volatile storage such as a disc drive 40. The computer system may be connected to a network 50 such as a local area network or the Internet (or both). A keyboard 60, mouse or other user input device 70 and display screen 80 are also provided. The skilled man will appreciate that a general purpose computer system may include many other conventional parts which need not be described here.

Figure 2:
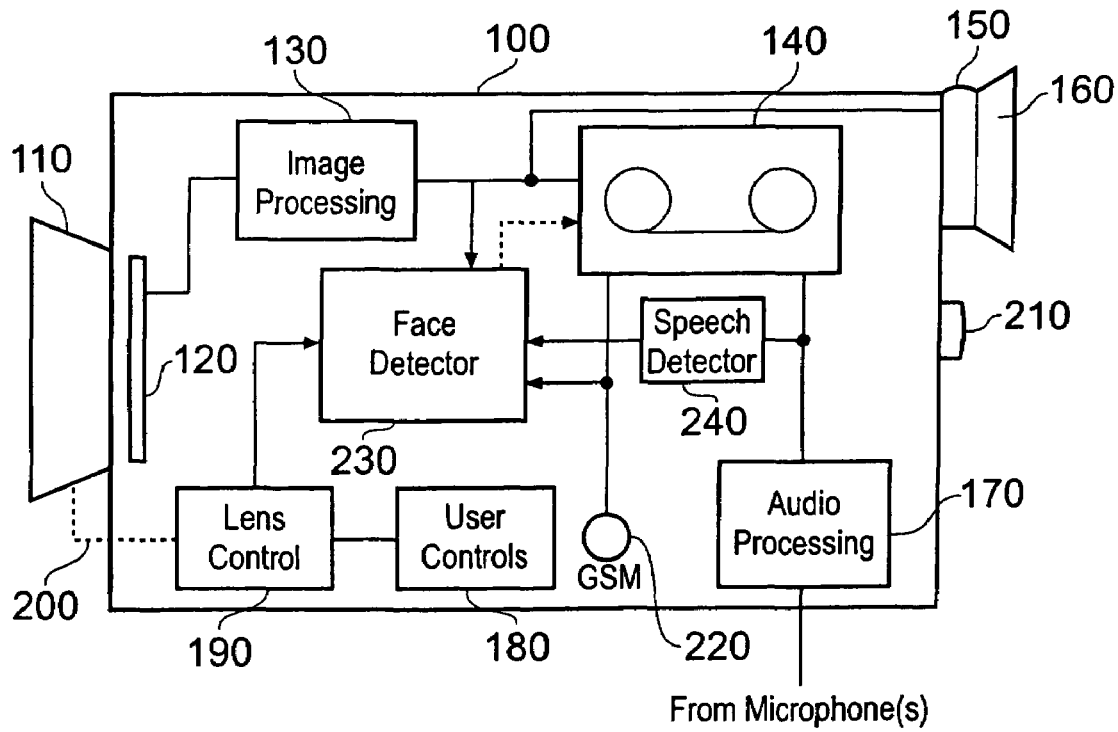
FIG. 2 is a schematic diagram of a video camera-recorder (camcorder) using face detection.

FIG. 2 is a schematic diagram of a video camera-recorder (camcorder) using face detection. The camcorder 100 comprises a lens 110 which focuses an image onto a charge coupled device (CCD) image capture device 120. The resulting image in electronic form is processed by image processing logic 130 for recording on a recording medium such as a tape cassette 140. The images captured by the device 120 are also displayed on a user display 150 which may be viewed through an eyepiece 160.

To capture sounds associated with the images, one or more microphones are used. These may be external microphones, in the sense that they are connected to the camcorder by a flexible cable, or maybe mounted on the camcorder body itself. Analogue audio signals from the microphone(s) are processed by an audio processing arrangement 170 to produce appropriate audio signals for recording on the storage medium 140.

It is noted that the video and audio signals may be recorded on the storage medium 140 in either digital form or analogue form, or even in both forms. Thus, the image processing arrangement 130 and the audio processing arrangement 170 may include a stage of analogue to digital conversion.

The camcorder user is able to control aspects of the lens 110's performance by user controls 180 which influence a lens control arrangement 190 to send electrical control signals 200 to the lens 110. Typically, attributes such as focus and zoom are controlled in this way, but the lens aperture or other attributes may also be controlled by the user.

Two further user controls are schematically illustrated. A push button 210 is provided to initiate and stop recording onto the recording medium 140. For example, one push of the control 210 may start recording and another push may stop recording, or the control may need to be held in a pushed state for recording to take place, or one push may start recording for a certain timed period, for example five seconds. In any of these arrangements, it is technologically very straightforward to establish from the camcorder's record operation where the beginning and end of each "shot" (continuous period of recording) occurs.

The other user control shown schematically in FIG. 2 is a "good shot marker" (GSM) 220, which may be operated by the user to cause "metadata" (associated data) to be stored in connection with the video and audio material on the recording medium 140, indicating that this particular shot was subjectively considered by the operator to be "good" in some respect (for example, the actors performed particularly well; the news reporter pronounced each word correctly; and so on).

The metadata may be recorded in some spare capacity (e.g. "user data") on the recording medium 140, depending on the particular format and standard in use. Alternatively, the metadata can be stored on a separate storage medium such as a removable MemoryStick$^{RTM}$ memory (not shown), or the metadata could be stored on an external database (not shown), for example being communicated to such a database by a wireless link (not shown). The metadata can include not only the GSM information but also shot boundaries, lens attributes, alphanumeric information input by a user (e.g. on a keyboard—not shown), geographical position information from a global positioning system receiver (not shown) and so on.

So far, the description has covered a metadata-enabled camcorder. Now, the way in which face detection may be applied to such a camcorder will be described. It will of course be appreciated that the techniques are applicable to, for example, a networked camera such as an internet protocol (IP) camera, a video conferencing camera and the like.

The camcorder includes a face detector arrangement 230. Appropriate arrangements will be described in much greater detail below, but for this part of the description it is sufficient to say that the face detector arrangement 230 receives images from the image processing arrangement 130 and detects, or attempts to detect, whether such images contain one or more faces. The face detector may output face detection data which could be in the form of a "yes/no" flag or maybe more detailed in that the data could include the image co-ordinates of the faces, such as the co-ordinates of eye positions within each detected face. This information may be treated as another type of metadata and stored in any of the other formats described above.

As described below, face detection may be assisted by using other types of metadata within the detection process. For example, the face detector 230 receives a control signal from the lens control arrangement 190 to indicate the current focus and zoom settings of the lens 110. These can assist the face detector by giving an initial indication of the expected image size of any faces that may be present in the foreground of the image. In this regard, it is noted that the focus and zoom settings between them define the expected separation between the camcorder 100 and a person being filmed, and also the magnification of the lens 110. From these two attributes, based upon an average face size, it is possible to calculate the expected size (in pixels) of a face in the resulting image data.

A conventional (known) speech detector 240 receives audio information from the audio processing arrangement 170 and detects the presence of speech in such audio information. The presence of speech may be an indicator that the likelihood of a face being present in the corresponding images is higher than if no speech is detected. In some embodiments, to be discussed below, the speech detector may be modified so as to provide a degree of location of a speaker by detecting a most active microphone from a set of microphones, or by a triangulation or similar technique between multiple microphones.

Finally, the GSM information 220 and shot information (from the control 210) are supplied to the face detector 230, to indicate shot boundaries and those shots considered to be most useful by the user.

Of course, if the camcorder is based upon the analogue recording technique, further analogue to digital converters (ADCs) may be required to handle the image and audio information.

Figure 3:
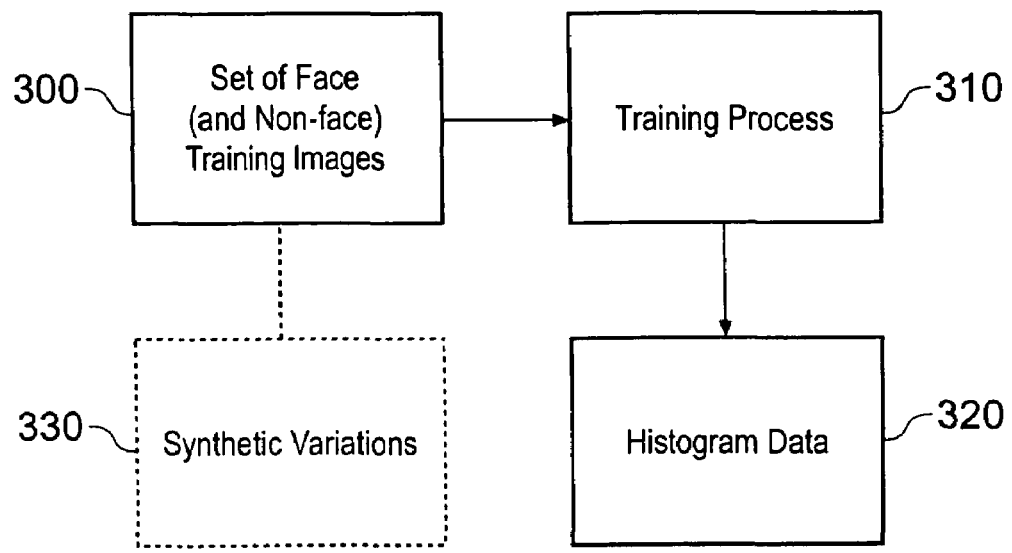
FIG. 3 is a schematic diagram illustrating a training process.
Figure 4:
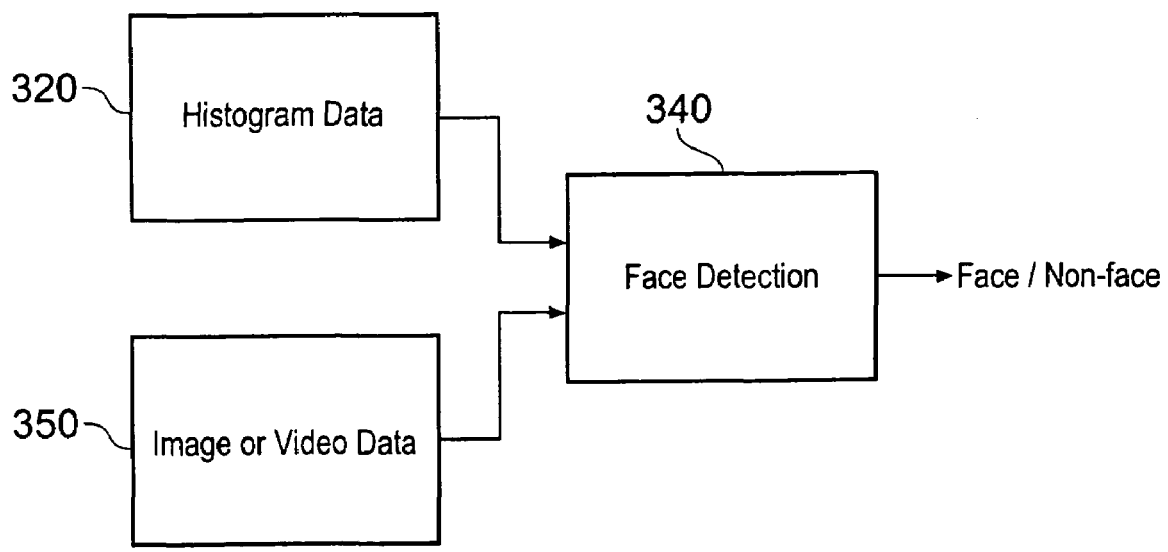
FIG. 4 is a schematic diagram illustrating a detection process.

The present embodiment uses a face detection technique arranged as two phases. FIG. 3 is a schematic diagram illustrating a training phase, and FIG. 4 is a schematic diagram illustrating a detection phase.

Unlike some previously proposed face detection methods (see References 4 and 5 below), the present method is based on modelling the face in parts instead of as a whole. The parts can either be blocks centred over the assumed positions of the facial features (so-called "selective sampling") or blocks sampled at regular intervals over the face (so-called "regular sampling"). The present description will cover primarily regular sampling, as this was found in empirical tests to give the better results.

In the training phase, an analysis process is applied to a set of images known to contain faces, and (optionally) another set of images ("nonface images") known not to contain faces. The analysis process builds a mathematical model of facial and nonfacial features, against which a test image can later be compared (in the detection phase).

Figure 5:
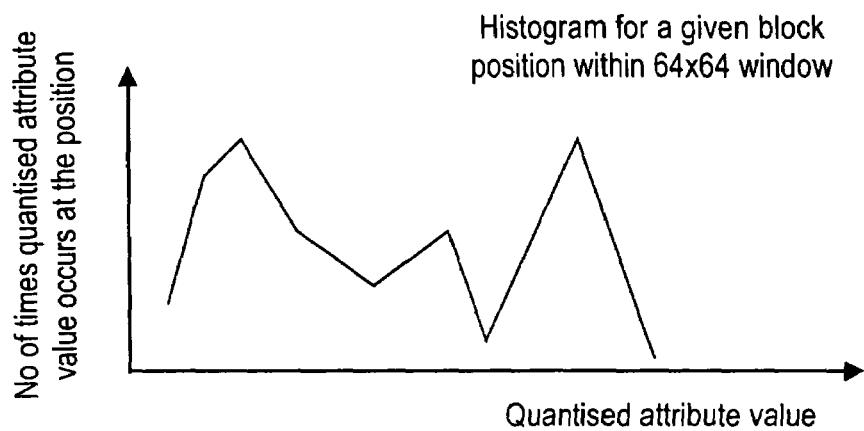
FIG. 5 schematically illustrates a feature histogram.

So, to build the mathematical model (the training process 310 of FIG. 3), the basic steps are as follows:

1. From a set 300 of face images normalised to have the same eye positions, each face is sampled regularly into small blocks.
2. Attributes are calculated for each block; these attributes are explained further below.
3. The attributes are quantised to a manageable number of different values.
4. The quantised attributes are then combined to generate a single quantised value in respect of that block position.
5. The single quantised value is then recorded as an entry in a histogram, such as the schematic histogram of FIG. 5. The collective histogram information 320 in respect of all of the block positions in all of the training images forms the foundation of the mathematical model of the facial features.

One such histogram is prepared for each possible block position, by repeating the above steps in respect of a large number of test face images. The test data are described further in Appendix A below. So, in a system which uses an array of 8×8 blocks, 64 histograms are prepared. In a later part of the processing, a test quantised attribute is compared with the histogram data; the fact that a whole histogram is used to model the data means that no assumptions have to be made about whether it follows a parameterised distribution, e.g. Gaussian or otherwise. To save data storage space (if needed), histograms which are similar can be merged so that the same histogram can be reused for different block positions.

In the detection phase, to apply the face detector to a test image 350, successive windows in the test image are processed 340 as follows:

6. The window is sampled regularly as a series of blocks, and attributes in respect of each block are calculated and quantised as in stages 1-4 above.
7. Corresponding "probabilities" for the quantised attribute values for each block position are looked up from the corresponding histograms. That is to say, for each block position, a respective quantised attribute is generated and is compared with a histogram previously generated in respect of that block position. The way in which the histograms give rise to "probability" data will be described below.
8. All the probabilities obtained above are multiplied together to form a final probability which is compared against a threshold in order to classify the window as "face" or "nonface". It will be appreciated that the detection result of "face" or "nonface" is a probability-based measure rather than an absolute detection. Sometimes, an image not containing a face may be wrongly detected as "face", a so-called false positive. At other times, an image containing a face may be wrongly detected as "nonface", a so-called false negative. It is an aim of any face detection system to reduce the proportion of false positives and the proportion of false negatives, but it is of course understood that to reduce these proportions to zero is difficult, if not impossible, with current technology.

As mentioned above, in the training phase, a set of "nonface" images can be used to generate a corresponding set of "nonface" histograms. Then, to achieve detection of a face, the "probability" produced from the nonface histograms may be compared with a separate threshold, so that the probability has to be under the threshold for the test window to contain a face. Alternatively, the ratio of the face probability to the nonface probability could be compared with a threshold.

Extra training data may be generated by applying "synthetic variations" 330 to the original training set, such as variations in position, orientation, size, aspect ratio, background scenery, lighting intensity and frequency content.

The derivation of attributes and their quantisation will now be described. In the present technique, attributes are measured with respect to so-called eigenblocks, which are core blocks (or eigenvectors) representing different types of block which may be present in the windowed image. The generation of eigenblocks will first be described with reference to FIG. 6.

Eigenblock Creation

The attributes in the present embodiment are based on so-called eigenblocks. The eigenblocks were designed to have good representational ability of the blocks in the training set. Therefore, they were created by performing principal component analysis on a large set of blocks from the training set. This process is shown schematically in FIG. 6 and described in more detail in Appendix B.

Training the System

Experiments were performed with two different sets of training blocks.

Eigenblock set I

Figure 6:
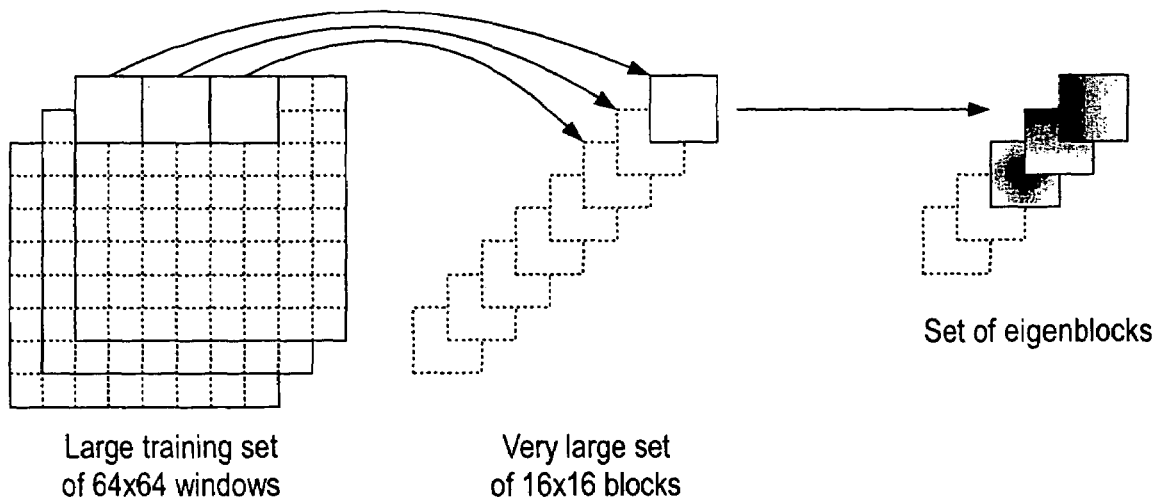
FIG. 6 schematically illustrates a sampling process to generate eigenblocks.

Initially, a set of blocks were used that were taken from 25 face images in the training set. The 16×16 blocks were sampled every 16 pixels and so were non-overlapping. This sampling is shown in FIG. 6. As can be seen, 16 blocks are generated from each 64×64 training image. This leads to a total of 400 training blocks overall.

Figure 7:
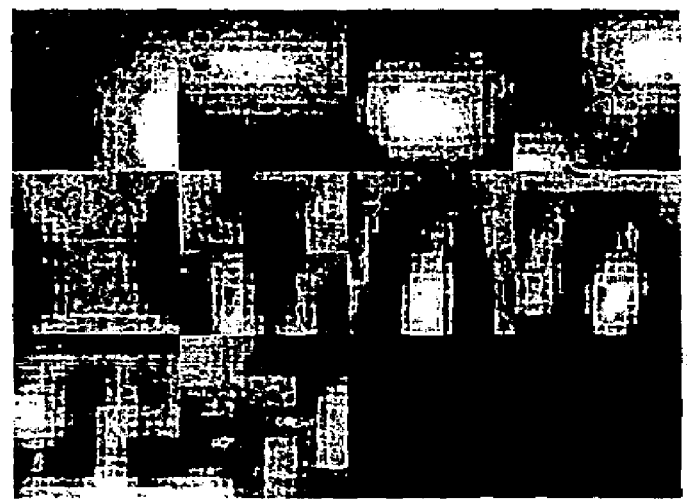
FIGS. 7 and 8 schematically illustrates sets of eigenblocks.

The first 10 eigenblocks generated from these training blocks are shown in FIG. 7.

Eigenblock set II A second set of eigenblocks was generated from a much larger set of training blocks. These blocks were taken from 500 face images in the training set. In this case, the 16×16 blocks were sampled every 8 pixels and so overlapped by 8 pixels. This generated 49 blocks from each 64×64 training image and led to a total of 24,500 training blocks.

Figure 8:
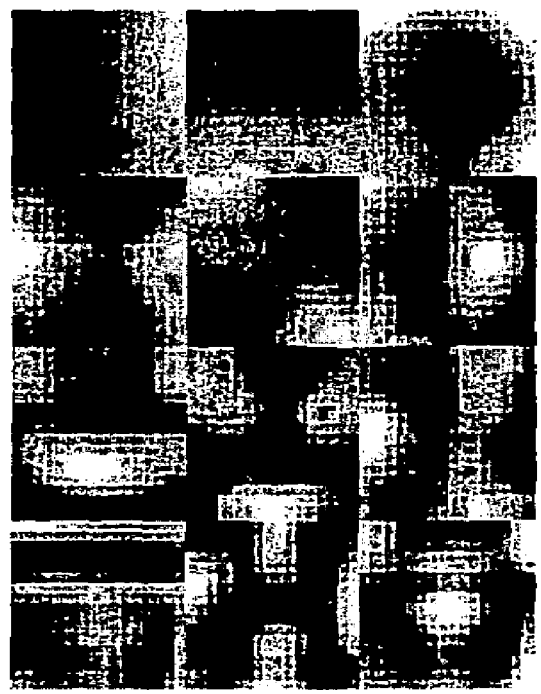

The first 12 eigenblocks generated from these training blocks are shown in FIG. 8.

Empirical results show that eigenblock set II gives slightly better results than set I. This is because it is calculated from a larger set of training blocks taken from face images, and so is perceived to be better at representing the variations in faces. However, the improvement in performance is not large.

Building the Histograms

A histogram was built for each sampled block position within the 64×64 face image. The number of histograms depends on the block spacing. For example, for block spacing of 16 pixels, there are 16 possible block positions and thus 16 histograms are used.

Figure 9:
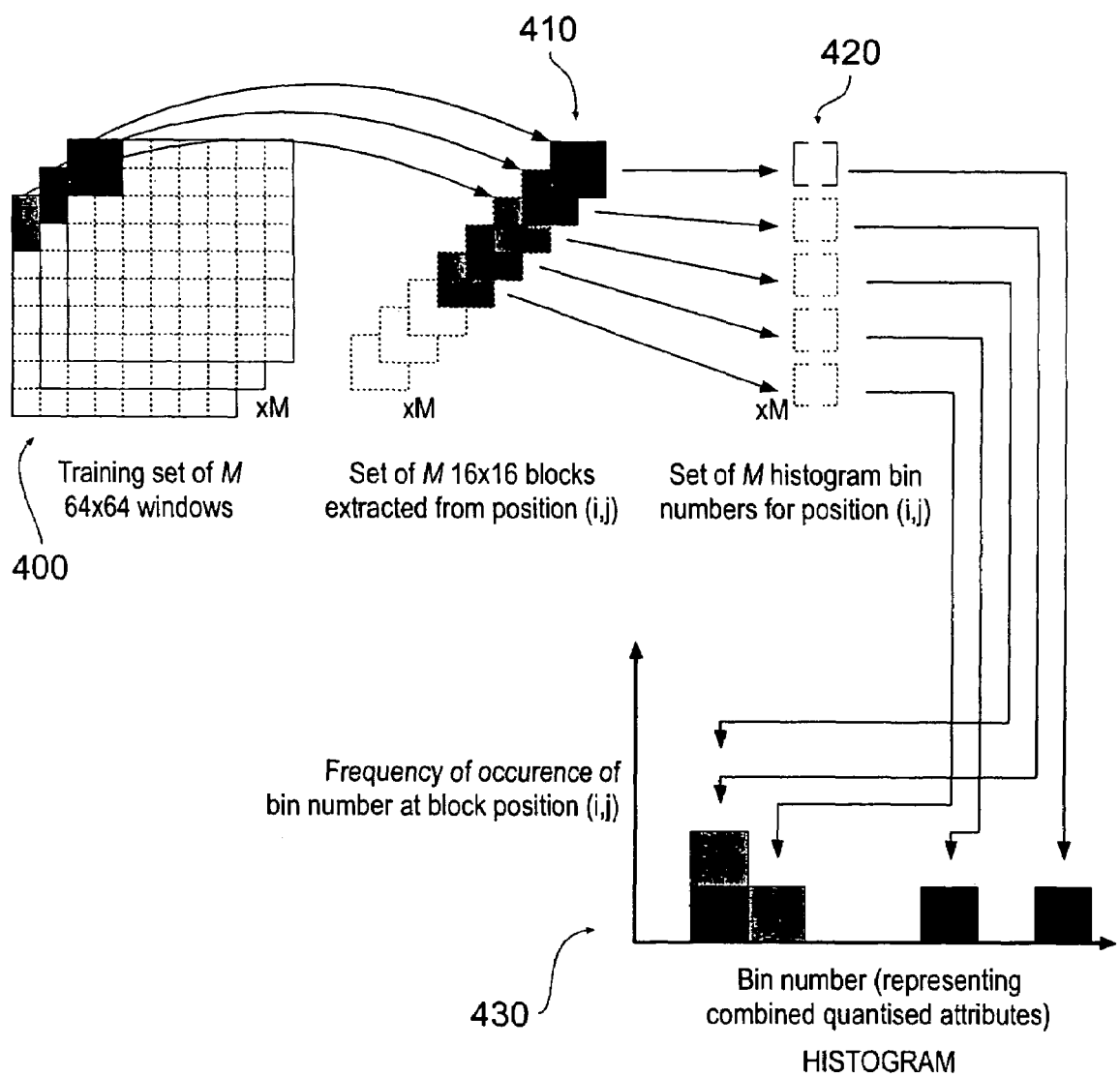
FIG. 9 schematically illustrates a process to build a histogram representing a block position.

The process used to build a histogram representing a single block position is shown in FIG. 9. The histograms are created using a large training set 400 of M face images. For each face image, the process comprises:

Extracting 410 the relevant block from a position (i,j) in the face image.

Calculating the eigenblock-based attributes for the block, and determining the relevant bin number 420 from these attributes.

Incrementing the relevant bin number in the histogram 430.

This process is repeated for each of M images in the training set, to create a histogram that gives a good representation of the distribution of frequency of occurrence of the attributes. Ideally, M is very large, e.g. several thousand. This can more easily be achieved by using a training set made up of a set of original faces and several hundred synthetic variations of each original face.

Generating the Histogram Bin Number

Figure 10:
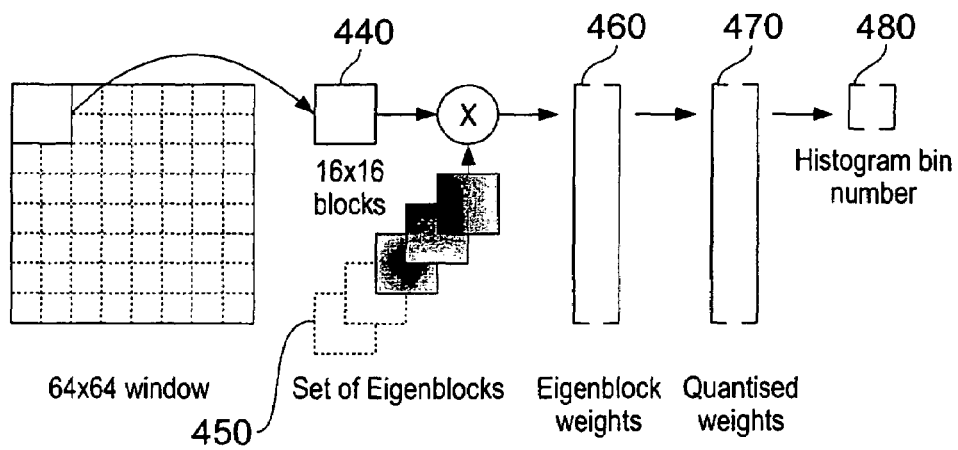
FIG. 10 schematically illustrates the generation of a histogram bin number.

A histogram bin number is generated from a given block using the following process, as shown in FIG. 10. The 16×16 block 440 is extracted from the 64×64 window or face image. The block is projected onto the set 450 of A eigenblocks to generate a set of "eigenblock weights". These eigenblock weights are the "attributes" used in this implementation. They have a range of −1 to +1. This process is described in more detail in Appendix B. Each weight is quantised into a fixed number of levels, L, to produce a set of quantised attributes 470, $w_i$, i=1 . . . A. The quantised weights are combined into a single value as follows:

$$h = w_1 \cdot L^{A-1} + w_2 L^{A-2} + w_3 L^{A-3} + \ldots + w_{A-1} L^1 + w_A L^0$$

where the value generated, h, is the histogram bin number 480. Note that the total number of bins in the histogram is given by $L^A$.

The bin "contents", i.e. the frequency of occurrence of the set of attributes giving rise to that bin number, may be considered to be a probability value if it is divided by the number of training images M. However, because the probabilities are compared with a threshold, there is in fact no need to divide through by M as this value would cancel out in the calculations. So, in the following discussions, the bin "contents" will be referred to as "probability values", and treated as though they are probability values, even though in a strict sense they are in fact frequencies of occurrence.

The above process is used both in the training phase and in the detection phase.

Face Detection Phase

The face detection process involves sampling the test image with a moving 64×64 window and calculating a face probability at each window position.

Figure 11:
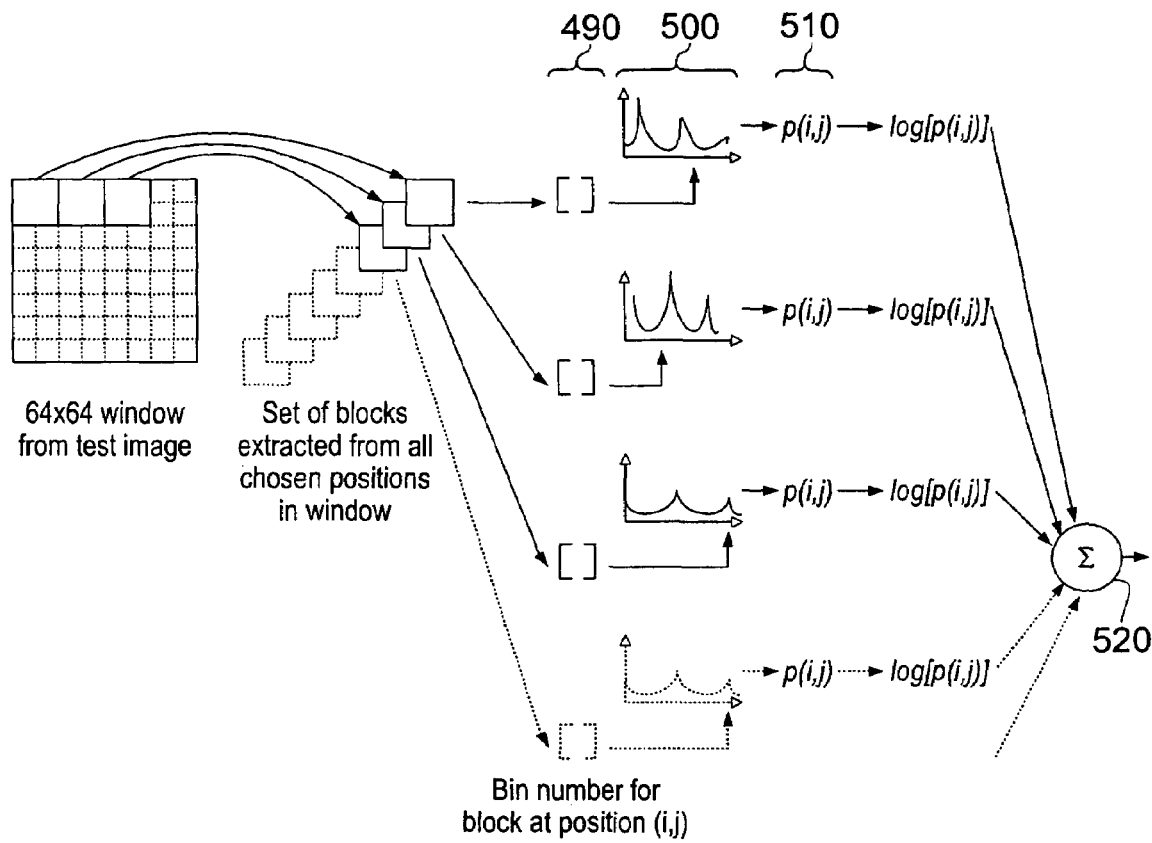
FIG. 11 schematically illustrates the calculation of a face probability.

The calculation of the face probability is shown in FIG. 11. For each block position in the window, the block's bin number 490 is calculated as described in the previous section. Using the appropriate histogram 500 for the position of the block, each bin number is looked up and the probability 510 of that bin number is determined. The sum 520 of the logs of these probabilities is then calculated across all the blocks to generate a face probability value, $P_{face}$ (otherwise referred to as a log likelihood value).

This process generates a probability "map" for the entire test image. In other words, a probability value is derived in respect of each possible window centre position across the image. The combination of all of these probability values into a rectangular (or whatever) shaped array is then considered to be a probability "map" corresponding to that image.

This map is then inverted, so that the process of finding a face involves finding minima in the inverted map (of course this is equivalent to not inverting the map and finding maxima; either could be done). A so-called distance-based technique is used. This technique can be summarised as follows: The map (pixel) position with the smallest value in the inverted probability map is chosen. If this value is larger than a threshold (TD), no more faces are chosen. This is the termination criterion. Otherwise a face-sized block corresponding to the chosen centre pixel position is blanked out (i.e. omitted from the following calculations) and the candidate face position finding procedure is repeated on the rest of the image until the termination criterion is reached.

Nonface Method

The nonface model comprises an additional set of histograms which represent the probability distribution of attributes in nonface images. The histograms are created in exactly the same way as for the face model, except that the training images contain examples of nonfaces instead of faces.

During detection, two log probability values are computed, one using the face model and one using the nonface model. These are then combined by simply subtracting the nonface probability from the face probability:

$$P_{combined} = P_{face} - P_{nonface}$$

$P_{combined}$ is then used instead of $P_{face}$ to produce the probability map (before inversion).

Note that the reason that $P_{nonface}$ is subtracted from $P_{face}$ is because these are log probability values.

Note also that the face and non-face histograms may optionally be combined at the end of the training process (prior to face detection) by simply summing log histograms:

Summed histogram=log(histogram(face))+log (histogram(non_face))

This is why only one histogram is required for each block position/pose/eye spacing combination in the description below.

Histogram Examples

FIGS. 12a to 12f show some examples of histograms generated by the training process described above.

Figure 12A:
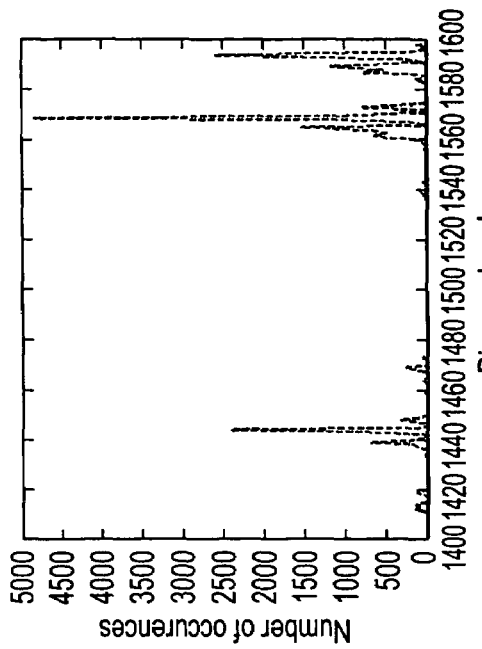
FIGS. 12a to 12f are schematic examples of histograms generated using the above methods.
Figure 12B:
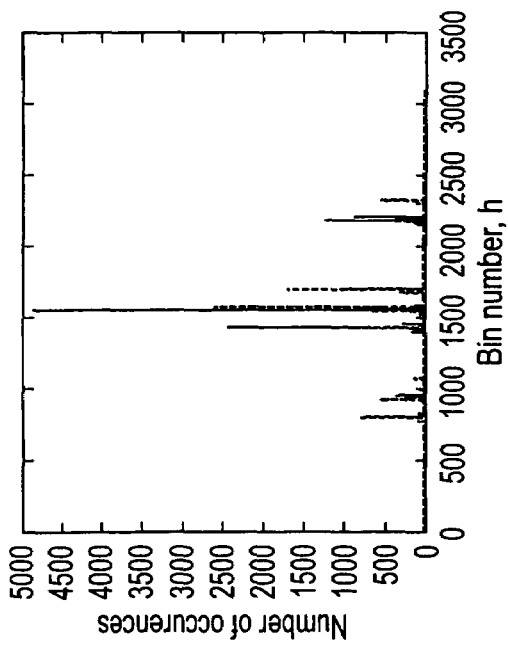
Figure 12C:
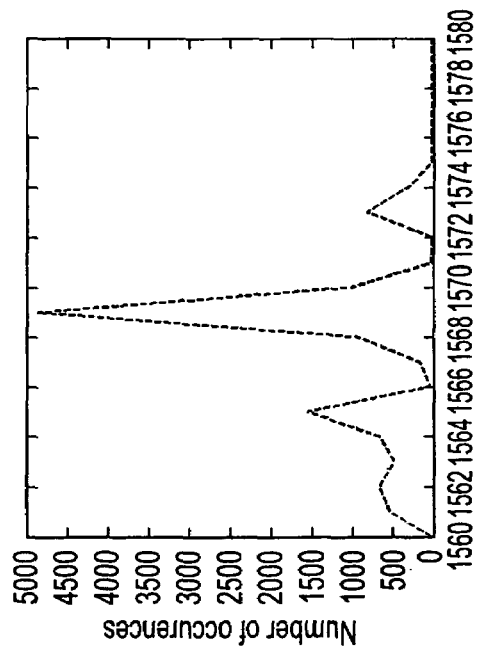
Figure 12E:
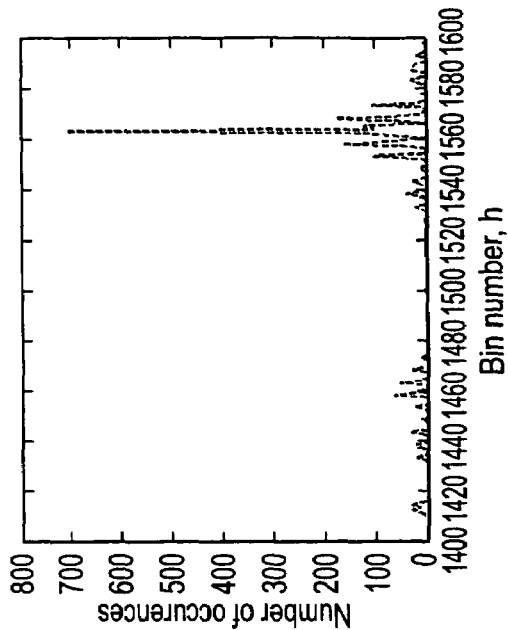
Figure 12D:
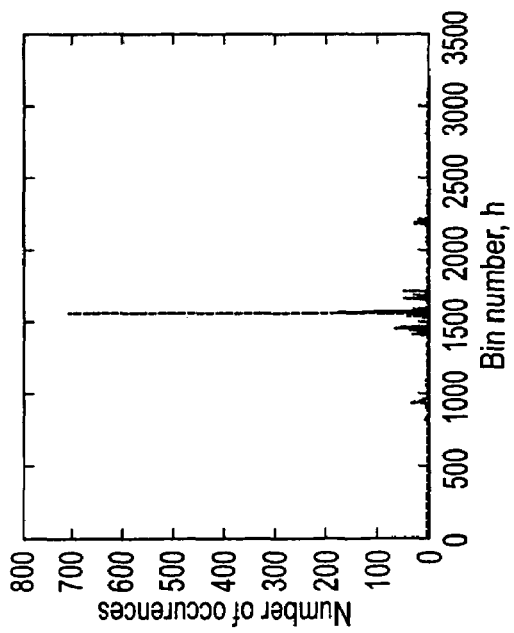
Figure 12F:
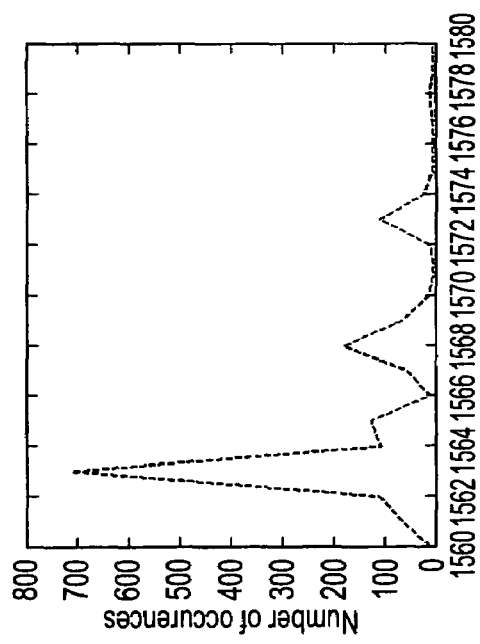

FIGS. 12a, 12b and 12c are derived from a training set of face images, and FIGS. 12d, 12e and 12f are derived from a training set of nonface images. In particular:

| | Face histograms | Nonface histograms |
|---|---|---|
| Whole histogram | FIG. 12a | FIG. 12d |
| Zoomed onto the main peaks at about h = 1500 | FIG. 12b | FIG. 12e |
| A further zoom onto the region about h = 1570 | FIG. 12c | FIG. 12f |

It can clearly be seen that the peaks are in different places in the face histogram and the nonface histograms.

Histogram Storage

As described above, the histograms store statistical information about the likelihood of a face at a given scale and location in an image. However, the ordering of the histograms is unexpectedly significant to system performance. A simple ordering can result in the access being non-localised (i.e. consecutive accesses are usually far apart in memory). This can give poor cache performance when implemented using microprocessors or bespoke processors. To address this problem the histograms are reordered so that the access to the data are more localised.

In the present embodiment there are 6 histograms in total:

| | |
|---|---|
| $F^{38}$ | Frontal face with an eye spacing of 38 pixels (that is, a "zoomed in" histogram) |
| $L^{38}$ | Face facing to the left by 25 degrees, with an eye spacing of 38 pixels |
| $R^{38}$ | Face facing to the right by 25 degrees, with an eye spacing of 38 pixels |
| $F^{22}$ | Frontal face with an eye spacing of 22 pixels (that is, a "full face" histogram) |
| $L^{22}$ | Face facing to the left by 25 degrees, with an eye spacing of 22 pixels |
| $R^{22}$ | Face facing to the right by 25 degrees, with an eye spacing of 22 pixels |

In the following discussion:

c is the value from the binmap (a map giving the histogram entry for each location in the image) for a given location in the image at a given scale—in the present case this is a 9 bit binary number. The binmap is precalculated by convolving the image with 9 eigenblocks, quantising the resulting 9 eigenblock weights and combining them into a single value;

x is the x location within the face window (between 0 and 6); and y is the y location within the face window (between 0 and 6).

This means that the histograms for each pose (e.g. $F^{38}$) are 512×7×7=25088 bytes in size.

$F_{c,x,y}^{38}$ is the value of the histogram for a given c, x & y.

For example, $F_{15,4,5}^{38}$ is the value given by the frontal histogram with the 38 eye spacing at location (4,5) in the face window, for a binmap value of 15.

A straightforward ordering of the histograms in memory is by c, then x, then y, then pose, and then eye spacing. A schematic example of this ordering is shown in FIG. 13a. An improved ordering system is by pose then x then y then c and then eye spacing. A schematic example of this type of ordering is shown in FIG. 13b.

There are two reasons for the improvements in cache performance when the histograms are ordered in the new way:
(i) the way the poses are accessed; and
(ii) the way that the face window moves during a face search.

The three different poses (left, right and frontal) are always accessed with the same bin-number and location for each location. i.e. if $F_{329,2,1}^{38}$ is accessed, then $L_{329,2,1}^{38}$ & $R_{329,2,1}^{38}$ are also accessed. These are adjacent in the new method, so excellent cache performance is achieved.

The new method of organising the histograms also takes advantage of the way that the face window moves during a search for faces in the image. Because of the way that the face window moves the same c value will be looked up in many (x,y) locations.

FIG. 14 shows which values are used from the bin map to look for a face in a certain location. For example, $F_{329,2,1}^{38}$ is the value from the frontal histogram for eye spacing 38 for the (2,1) location in the face window.

It can be seen that when the face detection window moves 2 spaces to the right, that the highlighted squares will be shifted one place to the left. i.e. the same value will be looked up in a different location. In the example in FIG. 14 $F_{329,2,1}^{38}$ will become $F_{329,1,1}^{38}$ when the face window has shifted right by two.

As the algorithm searches for faces by shifting the face window through the image it will look up the same binmap in several locations. This means that if these values are stored close together in memory, then cache performance will be improved.

Another improvement which can be made to the histogram structure, either together with or independently from the improvement described above, is that side poses use fewer bits than frontal poses. The values stored in each histogram bin are quantised to a different number of bits depending on which pose they represent.

The number of bits used for each of the six histograms is summarised below:

| | |
|---|---|
| $F^{38}$ | Frontal face with an eye spacing of 38 pixels - 8 bits |
| $L^{38}$ | Face facing to the left by 25 degrees, with an eye spacing of 38 pixels - 4 bits |
| $R^{38}$ | Face facing to the right by 25 degrees, with an eye spacing of 38 pixels - 4 bits |
| $F^{22}$ | Frontal face with an eye spacing of 22 pixels - 8 bits |
| $L^{22}$ | Face facing to the left by 25 degrees, with an eye spacing of 22 pixels - 4 bits |
| $R^{22}$ | Face facing to the right by 25 degrees, with an eye spacing of 22 pixels - 4 bits |

The advantage of this is that each set of 3 histogram values can be stored in 2 bytes instead of 3.

It was found that this is possible because the side poses have less importance than the frontal pose on the overall performance of the algorithm, and so these can be represented with reduced resolution without significantly affecting accuracy.

Multiscale Face Detection

In order to detect faces of different sizes in the test image, the test image is scaled by a range of factors and a distance (i.e. probability) map is produced for each scale. In FIGS. 15a to 15c the images and their corresponding distance maps are shown at three different scales. The method gives the best response (highest probability, or minimum distance) for the large (central) subject at the smallest scale (FIG. 15a) and better responses for the smaller subject (to the left of the main figure) at the larger scales. (A darker colour on the map represents a lower value in the inverted map, or in other words a higher probability of there being a face). Candidate face positions are extracted across different scales by first finding the position which gives the best response over all scales. That is to say, the highest probability (lowest distance) is established amongst all of the probability maps at all of the scales. This candidate position is the first to be labelled as a face. The window centred over that face position is then blanked out from the probability map at each scale. The size of the window blanked out is proportional to the scale of the probability map.

Examples of this scaled blanking-out process are shown in FIGS. 15a to 15c. In particular, the highest probability across all the maps is found at the left hand side of the largest scale map (FIG. 15c). An area 530 corresponding to the presumed size of a face is blanked off in FIG. 15c. Corresponding, but scaled, areas 532, 534 are blanked off in the smaller maps.

Areas larger than the test window may be blanked off in the maps, to avoid overlapping detections. In particular, an area equal to the size of the test window surrounded by a border half as wide/long as the test window is appropriate to avoid such overlapping detections.

Additional faces are detected by searching for the next best response and blanking out the corresponding windows successively.

The intervals allowed between the scales processed are influenced by the sensitivity of the method to variations in size. It was found in this preliminary study of scale invariance that the method is not excessively sensitive to variations in size as faces which gave a good response at a certain scale often gave a good response at adjacent scales as well.

The above description refers to detecting a face even though the size of the face in the image is not known at the start of the detection process. Another aspect of multiple scale face detection is the use of two or more parallel detections at different scales to validate the detection process. This can have advantages if, for example, the face to be detected is partially obscured, or the person is wearing a hat etc.

FIGS. 15d to 15g schematically illustrate this process. During the training phase, the system is trained on windows (divided into respective blocks as described above) which surround the whole of the test face (FIG. 15d) to generate "full face" histogram data and also on windows at an expanded scale so that only a central area of the test face is included (FIG. 15e) to generate "zoomed in" histogram data. This generates two sets of histogram data. One set relates to the "full face" windows of FIG. 15d, and the other relates to the "central face area" windows of FIG. 15e.

During the detection phase, for any given test window 536, the window is applied to two different scalings of the test image so that in one (FIG. 15f) the test window surrounds the whole of the expected size of a face, and in the other (FIG. 15g) the test window encompasses the central area of a face at that expected size. These are each processed as described above, being compared with the respective sets of histogram data appropriate to the type of window. The log probabilities from each parallel process are added before the comparison with a threshold is applied.

Putting both of these aspects of multiple scale face detection together leads to a particularly elegant saving in the amount of data that needs to be stored.

Figure 15D:
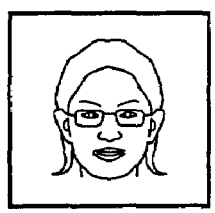
Figure 15E:
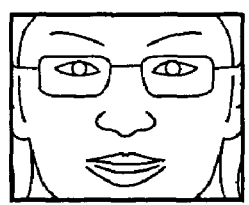

In particular, in these embodiments the multiple scales for the arrangements of FIGS. 15a to 15c are arranged in a geometric sequence. In the present example, each scale in the sequence is a factor of {fourth root}$\sqrt{2}$ different to the adjacent scale in the sequence. Then, for the parallel detection described with reference to FIGS. 15d to 15g, the larger scale, central area, detection is carried out at a scale 3 steps higher in the sequence, that is, $2^{3/4}$ times larger than the "full face" scale, using attribute data relating to the scale 3 steps higher in the sequence. So, apart from at extremes of the range of multiple scales, the geometric progression means that the parallel detection of FIGS. 15d to 15g can always be carried out using attribute data generated in respect of another multiple scale three steps higher in the sequence.

The two processes (multiple scale detection and parallel scale detection) can be combined in various ways. For example, the multiple scale detection process of FIGS. 15a to 15c can be applied first, and then the parallel scale detection process of FIGS. 15d to 15g can be applied at areas (and scales) identified during the multiple scale detection process. However, a convenient and efficient use of the attribute data may be achieved by:

deriving attributes in respect of the test window at each scale (as in FIGS. 15a to 15c)

comparing those attributes with the "full face" histogram data to generate a "full face" set of distance maps comparing the attributes with the "zoomed in" histogram data to generate a "zoomed in" set of distance maps for each scale n, combining the "full face" distance map for scale n with the "zoomed in" distance map for scale n+3 deriving face positions from the combined distance maps as described above with reference to FIGS. 15a to 15c Further parallel testing can be performed to detect different poses, such as looking straight ahead, looking partly up, down, left, right etc. Here a respective set of histogram data is required and the results are preferably combined using a "max" function, that is, the pose giving the highest probability is carried forward to thresholding, the others being discarded.

Improved Use of Multiple Scales

The face detection algorithm provides many probability maps at many scales; the requirement is to find all the places in the image where the probability exceeds a given threshold, whilst ensuring that there are no overlapping faces.

A disadvantage of the method described above is that it requires the storage of a complete set of probability maps at all scales, which is a large memory requirement. The following technique does not require the storage of all of the probability maps simultaneously.

In summary, a temporary list of candidate face locations is maintained. As the probability map for each scale is calculated, the probability maxima are found and compared against the list of candidate face locations to ensure that no overlapping faces exist.

In detail, this method uses a face list to maintain a list of current locations when there might be a face. Each face in the face list has a face location and a face size. The threshold is the probability threshold above which an object is deemed to be a face. The scale factor is the size factor between successive scales (1.189207115 or {fourth root}$\sqrt{2}$ in the present embodiment).

A 16×16 face_size is considered in the example description below.

Figure 16:
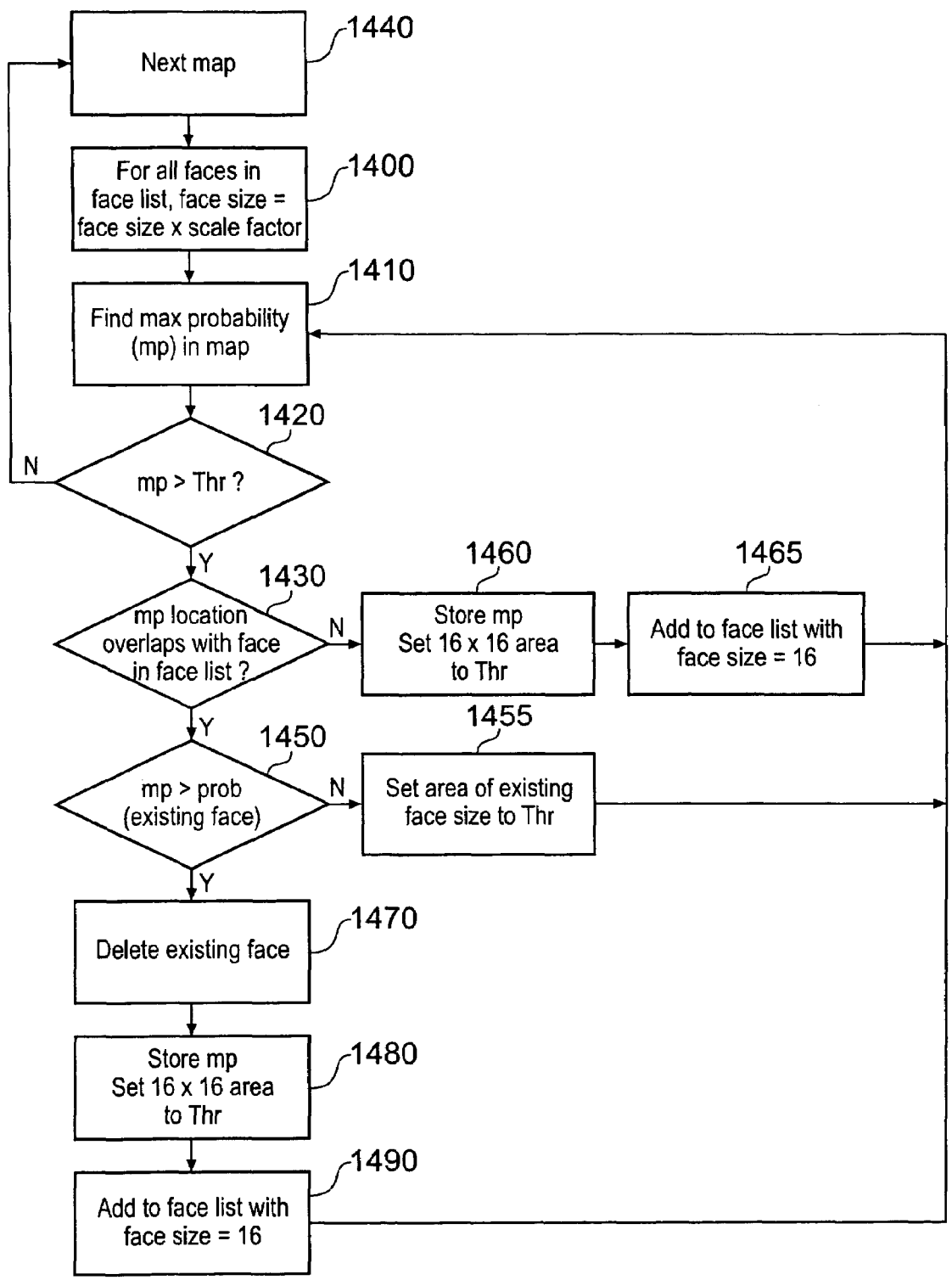
FIG. 16 is a schematic flowchart illustrating a technique for detecting face positions in a multiscale arrangement.

The process is schematically illustrated in the flowchart of FIG. 16.

Referring to FIG. 16, the process starts at a step 1400 in respect of one of the scales (in the example shown, the smallest scale). The first time that the step 1400 takes place, the face list will be empty, but in general, for all faces in the face list, the face size for each face is modified at the step 1400 by multiplying the respective face size by the scale factor. This makes sure that faces detected in respect of the previous scale are correctly sized for a valid comparison with any maxima in the current scale.

At a step 1410, the maximum probability value, mp, is detected in the current map.

At a step 1420, the maximum probability value mp is compared with the threshold. If mp is greater than the threshold then control passes to a step 1430. On the other hand, if mp is not greater than the threshold then processing of the next map (corresponding to the next scale factor to be dealt with) is initiated at a step 1440.

Returning to the step 1430, if the location within the current scale's probability map of the maximum value mp overlaps (coincides) with a face in the face list (considering the modified sizes derived at the step 1400), then control passes to a step 1450. If not, control passes to a step 1460.

At the step 1450, the value mp is compared with a stored probability value in respect of the existing face. If mp is greater than that probability then the existing face is deleted at a step 1470 and a new entry created in the face list corresponding to the current value and position of mp. In particular, the value mp is stored in respect of the new entry in the face list and a 16×16 pixel area centred on the image position of the current maximum probability is set to the threshold at a step 1480. At a step 1490 the current location of the maximum probability value is added to the face list with a face size of 16. Control then returns to the step 1410.

Returning to the step 1460, if the maximum probability location was detected not to overlap with any faces in the face list (at the step 1430) then a new entry is created in the face list. As above, at the step 1460 the value mp is stored and a 16×16 area surrounding the current maximum value is set to the threshold. At a step 1465 the current maximum position is added to the face list with a face size of 16 and control returns to the step 1410.

If at the step 1450 the maximum probability value mp is detected not to be greater than the probability of the existing (overlapping) face then control passes to a step 1455 at which the area of the existing face is set to the threshold value and control returns to the step 1410.

At each of these stages, when control returns to the step 1410, a maximum probability value mp is again detected, but this will be in the light of modifications to the probability values surrounding detected faces in the steps 1460, 1455 and 1480. So, the modified values created at those steps will not in fact pass the test of the step 1420, in that a value set to equal the threshold value will be found not to exceed it. Accordingly, the step 1420 will establish whether another position exists in the correct map where the threshold value is exceeded.

An advantage of this method is that it allows each scale of probability map to be considered separately. Only the face list needs to be stored in between processing each scale.

This has the following advantages:
- Lower memory requirement: A complete set of probability maps do not need to be stored. Only the face list needs to be stored, which requires much less memory.
- Allows temporal decimation: The algorithm can use methods such as temporal decimation, where processing for one frame is divided between several timeslots and only a subset of scales are processed during each time slot. This method can now be used while only needing to maintain a face list between each call, instead of the entire set of probability maps calculated so far.
- Allows faster searching: Only one scale is considered at a time. Therefore, we do not need to blank out areas across all scales in a set of probability maps each time a maximum if found.

Change Detection

In situations where face detection has to be carried out in real time, it can be difficult to complete all of the face detection processing in the time allowed—e.g. one frame period of a video signal.

A change detection process is used to detect which areas of the image have changed since the previous frame, or at least to remove from the face detection process certain areas detected not to have changed since the previous frame.

Areas of the image that have not changed since the previous frame do not need to have face detection performed on them again, as the result is likely to be the same as the previous frame. However, areas of the images that have changed need to have face detection performed on them afresh. These areas of the image are labelled as "areas of interest" during change detection.

Figure 17:
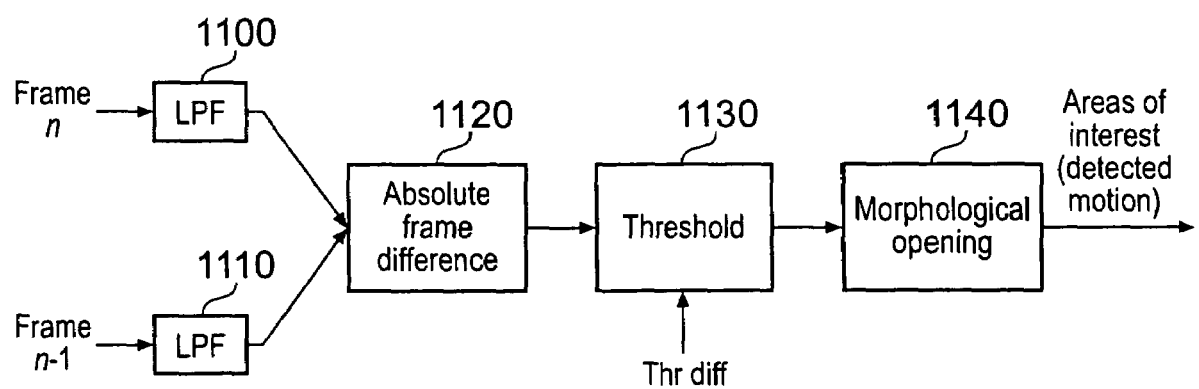
FIG. 17 schematically illustrates a motion detector.

In the present embodiment, change detection is performed only at a single fixed scale, e.g. the original image scale or the largest scale that is used in face detection. The process in illustrated in FIG. 17 which schematically illustrates a motion detector.

The current and previous frames are first processed by low pass filters 1100, 1110. The two frames are then supplied to a differencer 1120 to produce a frame difference image, for example a representation of the absolute pixel (or block) differences between frames with one difference value per pixel (or block) position. The absolute values of the difference image are then thresholded 1130 by comparison with a threshold value $Thr_{diff}$ to create a binary difference image, i.e. an array of one-bit values with one value per pixel (or block) position: very small differences are set to zero (no change) and larger differences are set to one (change detected). Finally, a morphological opening operation is performed 1140 on the binary difference image to create more contiguous areas of detected change/motion.

In practice, the low-pass filtering operation may be omitted.

Morphological opening is a known image processing technique and in this example is performed on a 3×3 area (i.e. a 3×3 block is used as the morphological structuring element) and comprises a morphological erosion operation followed by a morphological dilation operation. In order to carry this out in what is basically a raster-based system, the morphological processing is carried out after processing every third line.

Change detection can be applied to the whole image, as described above, to create a map of areas of the image where changes have been detected. Face detection is applied to those areas.

Alternatively, change detection can be used to eliminate certain areas of the image from face detection, though without necessarily detecting all areas of motion or "no motion"This technique has the advantage of reducing the processing requirements of the change detection process while still potentially providing a useful saving in processing for the face detection itself. A schematic example of this process is illustrated in FIGS. 18a to 18

Figure 18A:
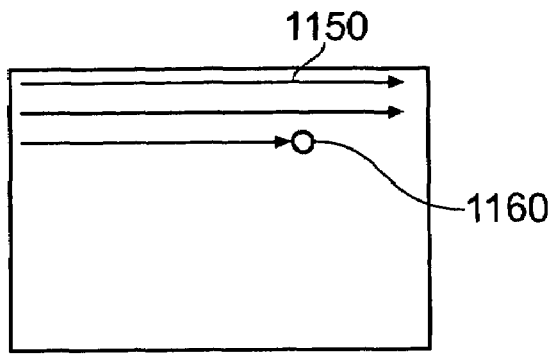
FIGS. 18a to 18e schematically illustrate a technique for detecting an area of change in an image.
Figure 18B:
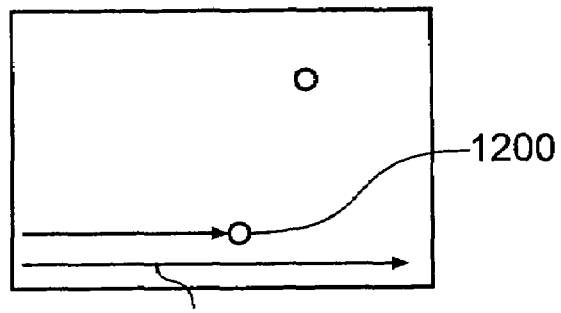
Figure 18C:
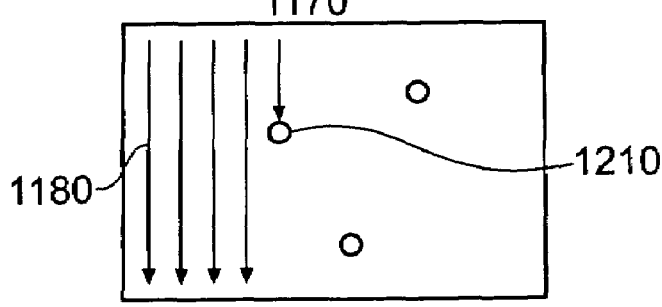
Figure 18D:
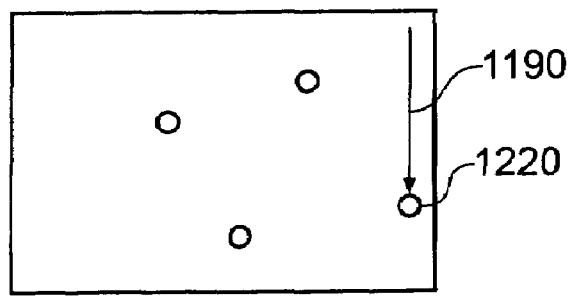

In FIG. 18a, change detection is applied in a raster scanning arrangement in which a scan 1150 of horizontal lines (of pixels or blocks) from top left towards bottom right of an image. The basic process shown in FIG. 17 (without morphological processing and preferably without low pass filtering) is used and the image is compared with the preceding image. At each scan point, the detected absolute difference is compared with the threshold value $Thr_{diff}$.

The scan 1150 progresses until the detected absolute difference in respect of one scan position 1160 exceeds the threshold $Thr_{diff}$. At this point the scan 1150 terminates.

Three similar scans 1170, 1180, 1190 are carried out. The scan 1170 is a horizontal scan starting at the bottom of the image and terminates when a scan position 1200 gives rise to an absolute difference value exceeding the threshold $Thr_{diff}$. The scan 1180 is a downwards vertical scan starting at the left hand side of the image and terminates when a scan position 1210 gives rise to an absolute difference value exceeding the threshold $Thr_{diff}$. And the scan 1190 is a downwards vertical scan starting at the right hand side of the image and terminates when a scan position 1220 gives rise to an absolute difference value exceeding the threshold $Thr_{diff}$.

Figure 18E:
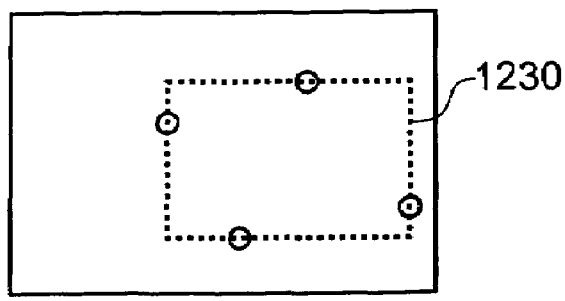

The four points 1160, 1200, 1210, 1220 define a bounding box 1230 in FIG. 18e. In particular, if the image co-ordinates of a point nnnn are $(x_{nnnn}, y_{nnnn})$ then the four vertices of the bounding box 1230 are given by:

| | |
|---|---|
| top left | $(x_{1210}, y_{1160})$ |
| top right | $(x_{1220}, y_{1160})$ |
| bottom left | $(x_{1210}, y_{1200})$ |
| bottom right | $(x_{1220}, y_{1200})$ |

The bounding box therefore does not define all areas of the image in which changes have been detected, but instead it defines an area (outside the bounding box) which can be excluded from face processing because change has not been detected there. As regards the area inside the bounding box, potentially all of the area may have changed, but a more usual situation would be that some parts of that area may have changed and some not.

Of course, there are several permutations of this technique:
(a) the order in which the 4 searches are performed
(b) the direction in which each search is performed (the arrows could be reversed in each diagram without changing the effect of the algorithm)
(c) whether the scans are carried out sequentially (one scan after another) or in parallel (two or more scans at the same time).

Figure 19A:
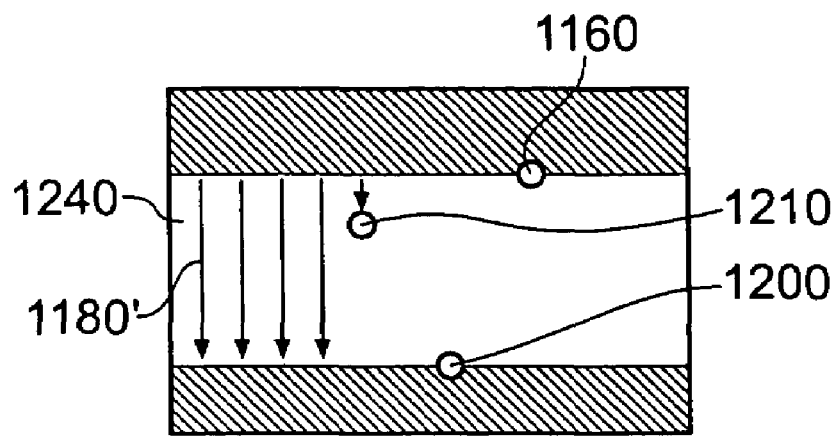
FIGS. 19a to 19c schematically illustrate an improvement on the technique of FIGS. 18a to 18e.
Figure 19B:
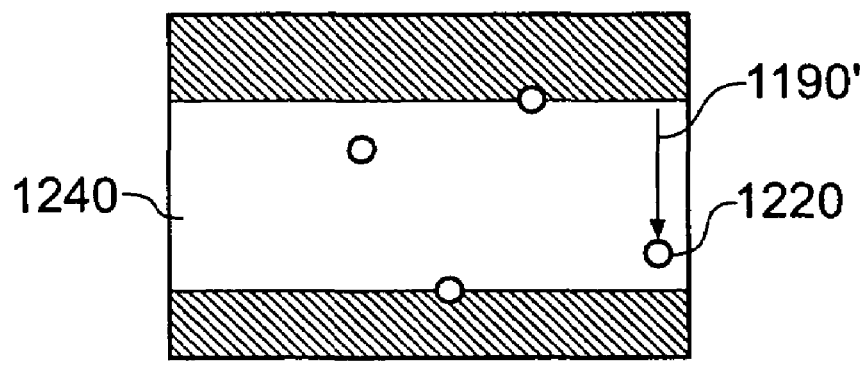
Figure 19C:
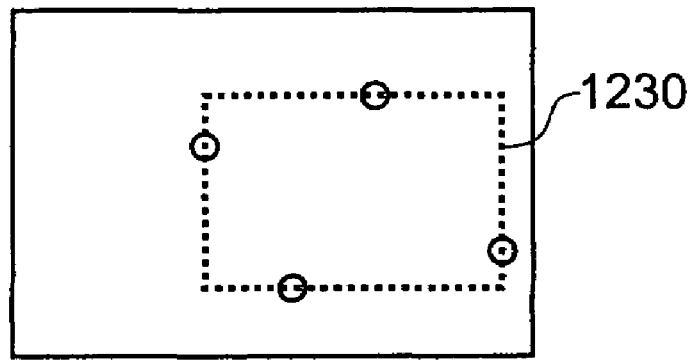

In a variation shown schematically in FIGS. 19a to 19c, the two vertical scans 1180', 1190' are carried out only in respect of those rows 1240 which have not already been eliminated by the two horizontal scans 1150, 1170. This variation can reduce the processing requirements.

The change detection techniques described above work well with the face detection techniques as follows. Change detection is carried out, starting from four extremes (edges) of the image, and stops in each case when a change is detected. So, apart from potentially the final pixel (or block) or part row/column of each of the change detection processes, change detection is carried out only in respect of those image areas which are not going to be subject to face detection. Similarly, apart from that final pixel, block or part row/column, face detection is carried out only in respect of areas which have not been subject to the change detection process. Bearing in mind that change detection is less processor-intensive than face detection, this relatively tiny overlap between the two processes means that in almost all situations the use of change detection will reduce the overall processing requirements of an image.

A different method of change detection applies to motion-encoded signals such as MPEG-encoded signals, or those which have been previously encoded in this form and decoded for face detection. Motion vectors or the like associated with the signals can indicate where an inter-image change has taken place. A block (e.g. an MPEG macroblock) at the destination (in a current image) of each motion vector can be flagged as an area of change. This can be done instead of or in addition to the change detection techniques described above.

Another method of reducing the processing requirements is as follows. The face detection algorithm is divided into a number of stages that are repeated over many scales. The algorithm is only completed after n calls. The algorithm is automatically partitioned so that each call takes approximately an equal amount of time. The key features of this method are:

- The method uses an automatic method to partition the algorithm into pieces that take an equal amount of processing time.
- Estimates are used for the processing time taken by each stage, so that the algorithm can return before executing a given stage if it will take too much time.
- The algorithm can only return at the end of each stage; it cannot return part way through a stage. This limits the amount of local storage required, and simplifies the program flow control.
- The estimates for the processing time taken for each stage could be automatically refined from real measured timing information—although this is not done at present.
- Tracking of faces can be done at the end of each call, so that even without a new face detection to give a new face position, the skin colour tracking will continue to follow the face.
- Alternatively, tracking can be performed only in the n+1 th call (after all the n face detection calls have been completed). This means tracking is performed at a lower rate and so is less accurate, but allows the algorithm to be scaled down to a shorter execution time per call, if this is required.

The following table shows the order that the stages are executed for a face search over 6 scales:

| Process | Scale | Description |
| --- | --- | --- |
| Motion | 1 | Motion is used to reduce search area |
| Variance | 1 | Image variance is used to reduce search area |
| Decimate | 1→2 | Image is reduced in size to next scale |
| Convolve | 2 | Image is convolved to produce bin-map |
| Decimate | 2→3 | |
| Convolve | 3 | |
| Decimate | 3→4 | |
| Convolve | 4 | |
| Lookup | 4 | Bin-maps are used to lookup face probabilities |
| Max-Search | 4 | Maximum probabilities are found and thresholded |
| Decimate | 4→5 | |
| Convolve | 5 | |
| Lookup | 5 | |
| Max-Search | 5 | |
| Decimate | 5→6 | |
| Convolve | 6 | |
| Lookup | 6 | |
| Max-Search | 6 | |
| Tracking | — | |

The following table shows what might happen if a temporal decimation of 4 is used. The algorithm automatically divides up the processing into 'chunks' of equal time—this is complicated by the fact that the processing for the earlier scales requires more time than the processing for later scales (the images being larger for the earlier scales). The algorithm estimates the amount of time that each stage will require before carrying it out. This estimate is given by the particular process and the number of pixels to be processed for a given scale. For example, the following estimates might have been used:

| Process | Scale | Call | # Pixels in scale | Processing units required | Cumulative Processing units per call |
| --- | --- | --- | --- | --- | --- |
| Motion | 1 | 1 | 1000 | 1000 | 1000 |
| Variance | 1 | 1 | 1000 | 1000 | 2000 |
| Decimate | 1→2 | 1 | 1000 | 2000 | 4000 |
| Tracking | — | 1 return | | | |
| Convolve | 2 | 2 | 700 | 2100 | 2100 |
| Decimate | 2→3 | 2 | 700 | 1400 | 3500 |
| Convolve | 3 | 2 | 500 | 1500 | 5000 |
| Tracking | — | 2 return | | | |
| Decimate | 3→4 | 3 | 500 | 1000 | 1000 |
| Convolve | 4 | 3 | 354 | 1062 | 2062 |
| Lookup | 4 | 3 | 354 | 1416 | 3478 |
| Max-Search | 4 | 3 | 354 | 1062 | 4540 |
| Decimate | 4→5 | 3 | 354 | 708 | 5248 |
| Tracking | — | 3 return | | | |
| Convolve | 5 | 4 | 250 | 750 | 750 |
| Lookup | 5 | 4 | 250 | 1000 | 1750 |
| Max-Search | 5 | 4 | 250 | 750 | 2500 |
| Decimate | 5→6 | 4 | 177 | 354 | 2854 |
| Convolve | 6 | 4 | 177 | 531 | 3385 |

-continued

| Process | Scale | Call | # Pixels in scale | Processing units required | Cumulative Processing units per call |
|---|---|---|---|---|---|
| Lookup | 6 | 4 | 177 | 708 | 4093 |
| Max-Search | 6 | 4 | 177 | 531 | 4624 |
| Tracking | | 4 | | | |
| | | return | | | |

Motion 1 per pixel
Variance 1 per pixel
Decimate 2 per pixel
Convolve 3 per pixel
Lookup 4 per pixel
Max Search 3 per pixel It is possible to calculate in advance that the total processing for all scales requires 18872 processing units. This means that to divide the processing into 4 equal chunks the system must execute about 4718 processing units per call.

Before each stage is executed the system calculates whether the number of cumulated processing units required will take it over some prearranged level (5300 for example). If it does, then a return is carried out without executing this stage. This has the advantage over timing that it is known in advance of doing something whether it will exceed the allotted time.

Spatial Decimation

Spatial decimation is another technique which can be used to reduce the processing requirements in respect of each image.

Two examples of spatial decimation will be described: one method searches the image in horizontal stripes, the other searches the image in a sparse manner.

Horizontal striping was chosen because it is considered more efficient to process horizontal stripes, although any sort of division could be used (squares, vertical stripes etc.)

It is also possible to control the spatial decimation in a sparse way. This is not as efficient as using stripes, but can give better results since faces can still be detected anywhere in the entire image each time the algorithm is called.

FIGS. 20a to 20c schematically illustrate a striping technique. In FIG. 20a, no spatial decimation is used and the entire image 1300 is subjected to face detection. In FIG. 20b, the image is split into two portions 1310, 1320. These are each subjected to face detection in alternate images. In FIG. 20c the image is split into three portions 1330, 1340, 1350 so that each portion is subjected to face detection for one in every three images. The portions may be distinct or may overlap slightly.

FIGS. 21a to 12d schematically illustrate so-called sparse spatial decimation.

Three variables are defined:

SparseX is a degree of decimation in the horizontal direction. If SparseX=1 then there is no horizontal decimation. If SparseX=2 then alternate pixels or blocks are subjected to face detection at each image, so that any one pixel or block position is subjected to face detection once in every two images, and so on.

SparseY is the equivalent degree of decimation in the vertical direction.

UseChequerBoard is set to zero if the decimation is aligned in successive rows or columns, and to one if it is offset between successive rows or columns (or groups of rows/columns).

The examples of FIGS. 21a to 21d are as follows:

| | FIG. 21a | FIG. 21b | FIG. 21c | FIG. 21d |
|---|---|---|---|---|
| SparseX | 2 | 2 | 2 | 2 |
| SparseY | 1 | 1 | 2 | 2 |
| UseChequerBoard | 0 | 1 | 0 | 1 |

A combination of spatial and temporal decimation can be used. For example, discrete spatial portions of an image (e.g. a third of an image) could be processed over a number of frames. The portions (e.g. the three thirds) processed in this way could come from the same image or from different respective images.

Face Tracking

A face tracking algorithm will now be described. The tracking algorithm aims to improve face detection performance in image sequences.

The initial aim of the tracking algorithm is to detect every face in every frame of an image sequence. However, it is recognised that sometimes a face in the sequence may not be detected. In these circumstances, the tracking algorithm may assist in interpolating across the missing face detections.

Ultimately, the goal of face tracking is to be able to output some useful metadata from each set of frames belonging to the same scene in an image sequence. This might include:

Number of faces.

"Mugshot" (a colloquial word for an image of a person's face, derived from a term referring to a police file photograph) of each face.

Frame number at which each face first appears.

Frame number at which each face last appears.

Identity of each face (either matched to faces seen in previous scenes, or matched to a face database)—this requires some face recognition also.

The tracking algorithm uses the results of the face detection algorithm, run independently on each frame of the image sequence, as its starting point. Because the face detection algorithm may sometimes miss (not detect) faces, some method of interpolating the missing faces is useful. To this end, a Kalman filter was used to predict the next position of the face and a skin colour matching algorithm was used to aid tracking of faces. In addition, because the face detection algorithm often gives rise to false acceptances, some method of rejecting these is also useful.

Figure 22:
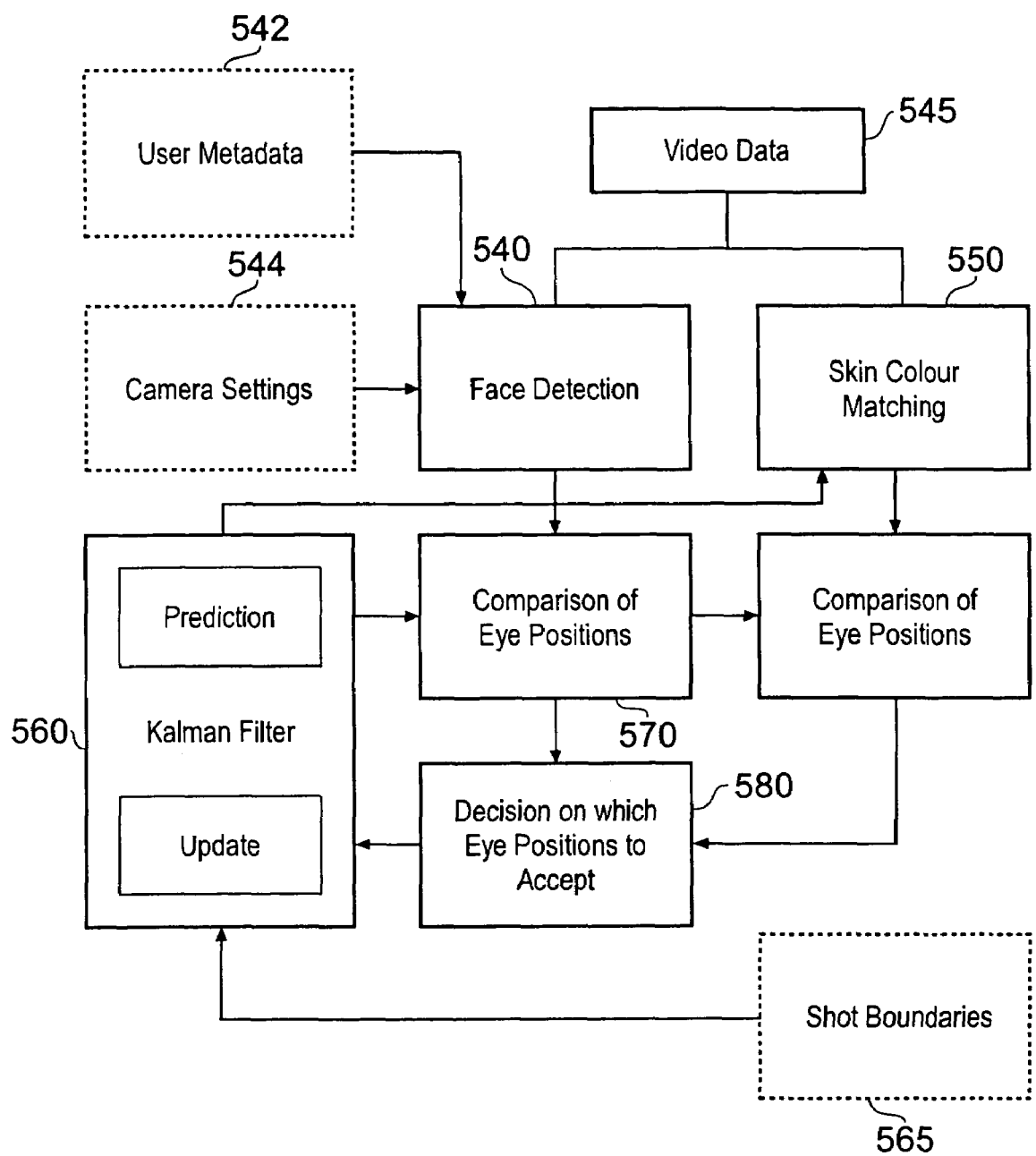
FIG. 22 schematically illustrates a face tracking algorithm.

The algorithm is shown schematically in FIG. 22.

The algorithm will be described in detail below, but in summary, input video data 545 (representing the image sequence) is supplied to a face detector of the type described in this application, and a skin colour matching detector 550. The face detector attempts to detect one or more faces in each image. When a face is detected, a Kalman filter 560 is established to track the position of that face. The Kalman filter generates a predicted position for the same face in the next image in the sequence. An eye position comparator 570, 580 detects whether the face detector 540 detects a face at that position (or within a certain threshold distance of that position) in the next image. If this is found to be the case, then that detected face position is used to update the Kalman filter and the process continues.

If a face is not detected at or near the predicted position, then a skin colour matching method 550 is used. This is a less precise face detection technique which is set up to have a lower threshold of acceptance than the face detector 540, so that it is possible for the skin colour matching technique to detect (what it considers to be) a face even when the face detector cannot make a positive detection at that position. If a "face" is detected by skin colour matching, its position is passed to the Kalman filter as an updated position and the process continues.

If no match is found by either the face detector 450 or the skin colour detector 550, then the predicted position is used to update the Kalman filter.

All of these results are subject to acceptance criteria (see below). So, for example, a face that is tracked throughout a sequence on the basis of one positive detection and the remainder as predictions, or the remainder as skin colour detections, will be rejected.

A separate Kalman filter is used to track each face in the tracking algorithm.

In order to use a Kalman filter to track a face, a state model representing the face must be created. In the model, the position of each face is represented by a 4-dimensional vector containing the co-ordinates of the left and right eyes, which in turn are derived by a predetermined relationship to the centre position of the window and the scale being used:

$$p(k) = \begin{bmatrix} FirstEyeX \\ FirstEyeY \\ SecondEyeX \\ SecondEyeY \end{bmatrix}$$

where k is the frame number.

The current state of the face is represented by its position, velocity and acceleration, in a 12-dimensional vector:

$$\hat{z}(k) = \begin{bmatrix} p(k) \\ \dot{p}(k) \\ \ddot{p}(k) \end{bmatrix}$$

First Face Detected

The tracking algorithm does nothing until it receives a frame with a face detection result indicating that there is a face present.

A Kalman filter is then initialised for each detected face in this frame. Its state is initialised with the position of the face, and with zero velocity and acceleration:

$$\hat{z}_a(k) = \begin{bmatrix} p(k) \\ 0 \\ 0 \end{bmatrix}$$

It is also assigned some other attributes: the state model error covariance, Q and the observation error covariance, R. The error covariance of the Kalman filter, P, is also initialised. These parameters are described in more detail below. At the beginning of the following frame, and every subsequent frame, a Kalman filter prediction process is carried out.

Kalman Filter Prediction Process

For each existing Kalman filter, the next position of the face is predicted using the standard Kalman filter prediction equations shown below. The filter uses the previous state (at frame k−1) and some other internal and external variables to estimate the current state of the filter (at frame k).

$$\hat{z}_b(k) = \Phi(k,k-1)\hat{z}_a(k-1)$$ State prediction equation $$P_b(k) = \Phi(k, k-1)P_a(k-1)\Phi(k, k-1)^T + Q(k)$$ Covariance prediction equation where $\hat{z}_b(k)$ denotes the state before updating the filter for frame k, $\hat{z}_a(k-1)$ denotes the state after updating the filter for frame k−1 (or the initialised state if it is a new filter), and $\Phi(k,k-1)$ is the state transition matrix. Various state transition matrices were experimented with, as described below. Similarly, $P_b(k)$ denotes the filter's error covariance before updating the filter for frame k and $P_a(k-1)$ denotes the filter's error covariance after updating the filter for the previous frame (or the initialised value if it is a new filter). $P_b(k)$ can be thought of as an internal variable in the filter that models its accuracy.

Q(k) is the error covariance of the state model. A high value of Q(k) means that the predicted values of the filter's state (i.e. the face's position) will be assumed to have a high level of error. By tuning this parameter, the behaviour of the filter can be changed and potentially improved for face detection.

State Transition Matrix

The state transition matrix, $\Phi(k,k-1)$, determines how the prediction of the next state is made. Using the equations for motion, the following matrix can be derived for $\Phi(k,k-1)$:

$$\Phi(k, k-1) = \begin{bmatrix} I_4 & I_4\Delta t & \frac{1}{2}I_4(\Delta t)^2 \\ O_4 & I_4 & I_4\Delta t \\ O_4 & O_4 & I_4 \end{bmatrix}$$

where $O_4$ is a 4×4 zero matrix and $I_4$ is a 4×4 identity matrix. $\Delta t$ can simply be set to 1 (i.e. units of t are frame periods).

This state transition matrix models position, velocity and acceleration. However, it was found that the use of acceleration tended to make the face predictions accelerate towards the edge of the picture when no face detections were available to correct the predicted state. Therefore, a simpler state transition matrix without using acceleration was preferred:

$$\Phi(k, k-1) = \begin{bmatrix} I_4 & I_4\Delta t & O_4 \\ O_4 & I_4 & O_4 \\ O_4 & O_4 & O_4 \end{bmatrix}$$

The predicted eye positions of each Kalman filter, $\hat{z}_b(k)$, are compared to all face detection results in the current frame (if there are any). If the distance between the eye positions is below a given threshold, then the face detection can be assumed to belong to the same face as that being modelled by the Kalman filter. The face detection result is then treated as an observation, y(k), of the face's current state:

$$y(k) = \begin{bmatrix} p(k) \\ 0 \\ 0 \end{bmatrix}$$

where p(k) is the position of the eyes in the face detection result. This observation is used during the Kalman filter update stage to help correct the prediction.

Skin Colour Matching

Skin colour matching is not used for faces that successfully match face detection results. Skin colour matching is only performed for faces whose position has been predicted by the Kalman filter but have no matching face detection result in the current frame, and therefore no observation data to help update the Kalman filter.

Figure 24:
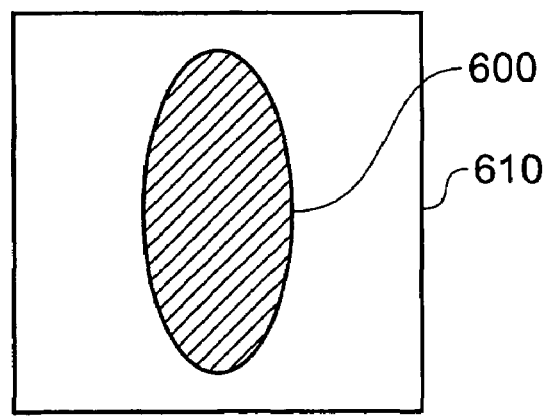
FIG. 24 schematically illustrates a mask applied to skin colour detection.

In a first technique, for each face, an elliptical area centred on the face's previous position is extracted from the previous frame. An example of such an area 600 within the face window 610 is shown schematically in FIG. 24. A colour model is seeded using the chrominance data from this area to produce an estimate of the mean and covariance of the Cr and Cb values, based on a Gaussian model.

An area around the predicted face position in the current frame is then searched and the position that best matches the colour model, again averaged over an elliptical area, is selected. If the colour match meets a given similarity criterion, then this position is used as an observation, y(k), of the face's current state in the same way described for face detection results in the previous section.

Figure 23A:
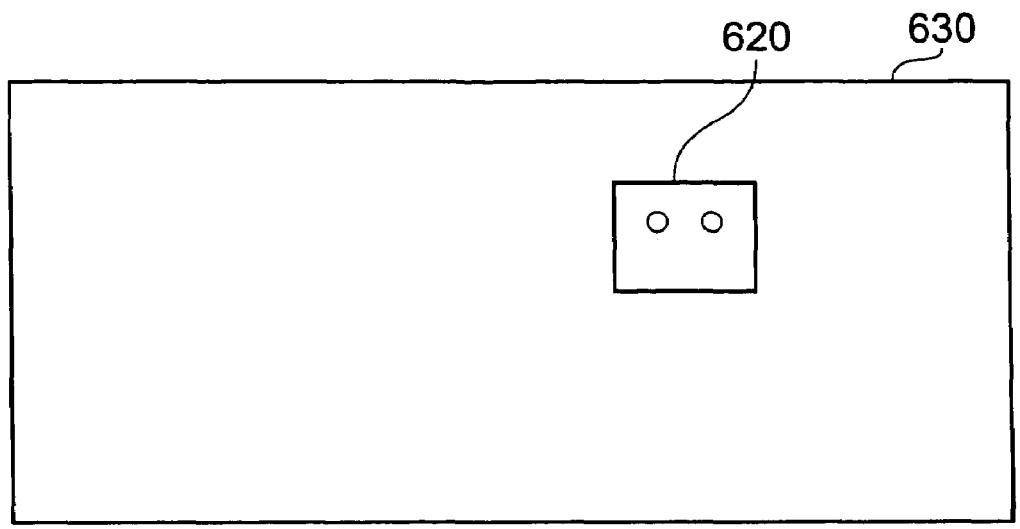
FIGS. 23a and 23b schematically illustrate the derivation of a search area used for skin colour detection.
Figure 23B:
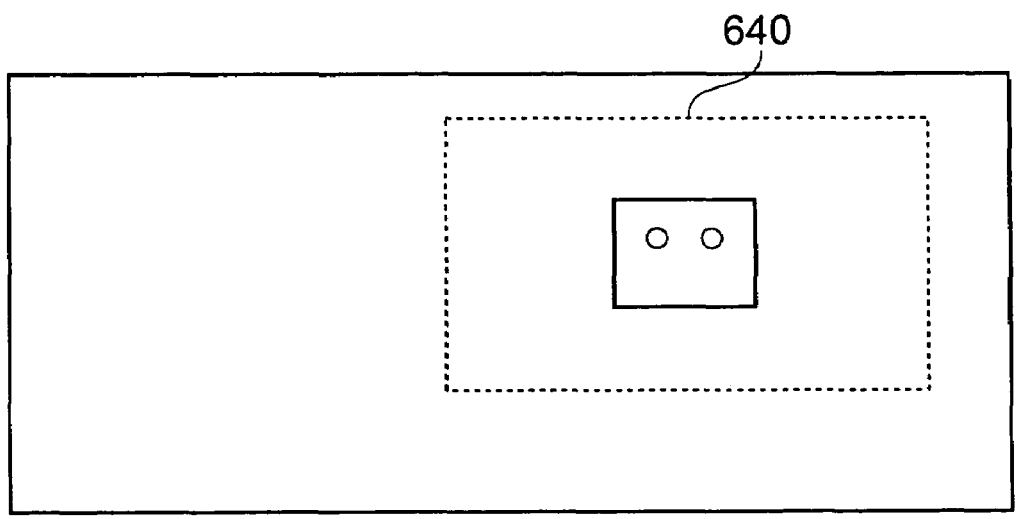

FIGS. 23a and 23b schematically illustrate the generation of the search area. In particular, FIG. 23a schematically illustrates the predicted position 620 of a face within the next image 630. In skin colour matching, a search area 640 surrounding the predicted position 620 in the next image is searched for the face.

If the colour match does not meet the similarity criterion, then no reliable observation data is available for the current frame. Instead, the predicted state, $\hat{z}_b(k)$ is used as the observation:

$$y(k)=\hat{z}_b(k)$$

The skin colour matching methods described above use a simple Gaussian skin colour model. The model is seeded on an elliptical area centred on the face in the previous frame, and used to find the best matching elliptical area in the current frame. However, to provide a potentially better performance, two further methods were developed: a colour histogram method and a colour mask method. These will now be described.

Colour Histogram Method

In this method, instead of using a Gaussian to model the distribution of colour in the tracked face, a colour histogram is used.

For each tracked face in the previous frame, a histogram of Cr and Cb values within a square window around the face is computed. To do this, for each pixel the Cr and Cb values are first combined into a single value. A histogram is then computed that measures the frequency of occurrence of these values in the whole window. Because the number of combined Cr and Cb values is large (256×256 possible combinations), the values are quantised before the histogram is calculated.

Having calculated a histogram for a tracked face in the previous frame, the histogram is used in the current frame to try to estimate the most likely new position of the face by finding the area of the image with the most similar colour distribution. As shown schematically in FIGS. 23a and 23b, this is done by calculating a histogram in exactly the same way for a range of window positions within a search area of the current frame. This search area covers a given area around the predicted face position. The histograms are then compared by calculating the mean squared error (MSE) between the original histogram for the tracked face in the previous frame and each histogram in the current frame. The estimated position of the face in the current frame is given by the position of the minimum MSE.

Various modifications may be made to this algorithm, including:

Using three channels (Y, Cr and Cb) instead of two (Cr, Cb).

Varying the number of quantisation levels.

Dividing the window into blocks and calculating a histogram for each block. In this way, the colour histogram method becomes positionally dependent. The MSE between each pair of histograms is summed in this method.

Varying the number of blocks into which the window is divided.

Varying the blocks that are actually used—e.g. omitting the outer blocks which might only partially contain face pixels.

For the test data used in empirical trials of these techniques, the best results were achieved using the following conditions, although other sets of conditions may provide equally good or better results with different test data:

3 channels (Y, Cr and Cb).

8 quantisation levels for each channel (i.e. histogram contains 8×8×8=512 bins).

Dividing the windows into 16 blocks.

Using all 16 blocks.

Colour Mask Method

This method is based on the method first described above. It uses a Gaussian skin colour model to describe the distribution of pixels in the face.

In the method first described above, an elliptical area centred on the face is used to colour match faces, as this may be perceived to reduce or minimise the quantity of background pixels which might degrade the model.

Figure 25A:
FIGS. 25a to 25c schematically illustrate the use of the mask of FIG. 24.
Figure 25B:
Figure 25C:

In the present colour mask model, a similar elliptical area is still used to seed a colour model on the original tracked face in the previous frame, for example by applying the mean and covariance of RGB or YCrCb to set parameters of a Gaussian model (or alternatively, a default colour model such as a Gaussian model can be used, see below). However, it is not used when searching for the best match in the current frame. Instead, a mask area is calculated based on the distribution of pixels in the original face window from the previous frame. The mask is calculated by finding the 50% of pixels in the window which best match the colour model. An example is shown in FIGS. 25a to 25c. In particular, FIG. 25a schematically illustrates the initial window under test; FIG. 25b schematically illustrates the elliptical window used to seed the colour model; and FIG. 25c schematically illustrates the mask defined by the 50% of pixels which most closely match the colour model.

Figure 26:
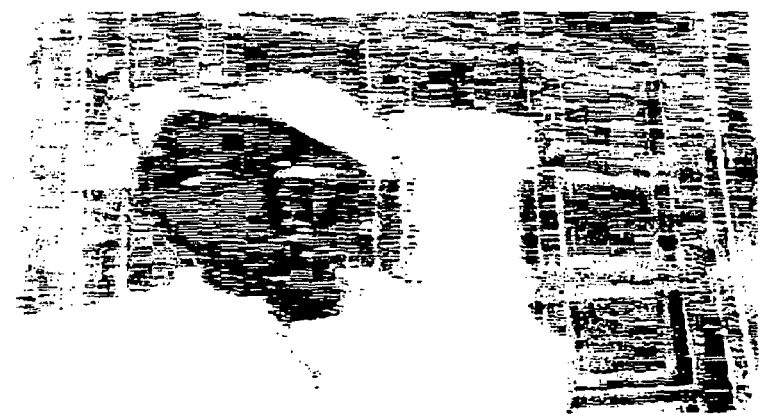
FIG. 26 is a schematic distance map.

To estimate the position of the face in the current frame, a search area around the predicted face position is searched (as before) and the "distance" from the colour model is calculated for each pixel. The "distance" refers to a difference from the mean, normalised in each dimension by the variance in that dimension. An example of the resultant distance image is shown in FIG. 26. For each position in this distance map (or for a reduced set of sampled positions to reduce computation time), the pixels of the distance image are averaged over a mask-shaped area. The position with the lowest averaged distance is then selected as the best estimate for the position of the face in this frame.

This method thus differs from the original method in that a mask-shaped area is used in the distance image, instead of an elliptical area. This allows the colour match method to use both colour and shape information.

Two variations are proposed and were implemented in empirical trials of the techniques:

(a) Gaussian skin colour model is seeded using the mean and covariance of Cr and Cb from an elliptical area centred on the tracked face in the previous frame.

(b) A default Gaussian skin colour model is used, both to calculate the mask in the previous frame and calculate the distance image in the current frame.

The use of Gaussian skin colour models will now be described further. A Gaussian model for the skin colour class is built using the chrominance components of the YCbCr colour space. The similarity of test pixels to the skin colour class can then be measured. This method thus provides a skin colour likelihood estimate for each pixel, independently of the eigenface-based approaches.

Let w be the vector of the CbCr values of a test pixel. The probability of w belonging to the skin colour class S is modelled by a two-dimensional Gaussian:

$$p(w|S) = \frac{\exp\left[-\frac{1}{2}(w-\mu_s)\sum_s^{-1}(w-\mu_s)\right]}{2\pi|\sum_s|^{\frac{1}{2}}}$$

where the mean $\mu_s$ and the covariance matrix $\Sigma_s$ of the distribution are (previously) estimated from a training set of skin colour values.

Skin colour detection is not considered to be an effective face detector when used on its own. This is because there can be many areas of an image that are similar to skin colour but are not necessarily faces, for example other parts of the body. However, it can be used to improve the performance of the eigenblock-based approaches by using a combined approach as described in respect of the present face tracking system. The decisions made on whether to accept the face detected eye positions or the colour matched eye positions as the observation for the Kalman filter, or whether no observation was accepted, are stored. These are used later to assess the ongoing validity of the faces modelled by each Kalman filter.

Figure 27:
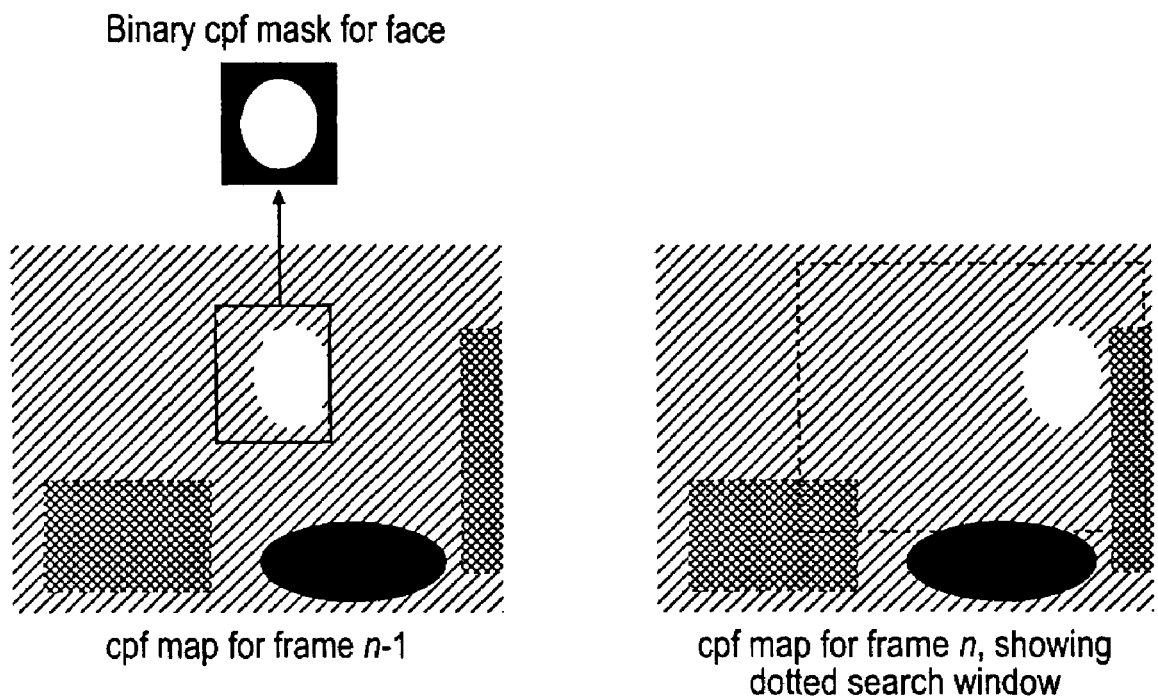
FIG. 27 schematically illustrates a colour mask process.

Variations on the colour mask method will be discussed below with reference to FIGS. 27 and 28.

Kalman Filter Update Step

The update step is used to determine an appropriate output of the filter for the current frame, based on the state prediction and the observation data. It also updates the internal variables of the filter based on the error between the predicted state and the observed state.

The following equations are used in the update step:

$K(k)=P_b(k)H^T(k)(H(k)P_b(k)H^T(k)+R(k))^{-1}$  Kalman gain equation $\hat{z}_a(k)=\hat{z}_b(k)+K(k)[y(k)-H(k)\hat{z}_b(k)]$  State update equation $P_a(k)=P_b(k)-K(k)H(k)P_b(k)$  Covariance update equation Here, K(k) denotes the Kalman gain, another variable internal to the Kalman filter. It is used to determine how much the predicted state should be adjusted based on the observed state, y(k).

H(k) is the observation matrix. It determines which parts of the state can be observed. In our case, only the position of the face can be observed, not its velocity or acceleration, so the following matrix is used for H(k)

$$H(k) = \begin{bmatrix} I_4 & O_4 & O_4 \\ O_4 & O_4 & O_4 \\ O_4 & O_4 & O_4 \end{bmatrix}$$

R(k) is the error covariance of the observation data. In a similar way to Q(k), a high value of R(k) means that the observed values of the filter's state (i.e. the face detection results or colour matches) will be assumed to have a high level of error. By tuning this parameter, the behaviour of the filter can be changed and potentially improved for face detection. For our experiments, a large value of R(k) relative to Q(k) was found to be suitable (this means that the predicted face positions are treated as more reliable than the observations). Note that it is permissible to vary these parameters from frame to frame. Therefore, an interesting future area of investigation may be to adjust the relative values of R(k) and Q(k) depending on whether the observation is based on a face detection result (reliable) or a colour match (less reliable).

For each Kalman filter, the updated state, $\hat{z}_a(k)$, is used as the final decision on the position of the face. This data is output to file and stored.

Unmatched face detection results are treated as new faces. A new Kalman filter is initialised for each of these. Faces are removed which:

Leave the edge of the picture and/or

Have a lack of ongoing evidence supporting them (when there is a high proportion of observations based on Kalman filter predictions rather than face detection results or colour matches).

For these faces, the associated Kalman filter is removed and no data is output to file. As an optional difference from this approach, where a face is detected to leave the picture, the tracking results up to the frame before it leaves the picture may be stored and treated as valid face tracking results (providing that the results meet any other criteria applied to validate tracking results).

These rules may be formalised and built upon by bringing in some additional variables:

| | |
|---|---|
| prediction_acceptance_ratio_threshold | If, during tracking a given face, the proportion of accepted Kalman predicted face positions exceeds this threshold, then the tracked face is rejected. This is currently set to 0.8. |
| detection_acceptance_ratio_threshold | During a final pass through all the frames, if for a given face the proportion of accepted face detections falls below this threshold, then the tracked face is rejected. This is currently set to 0.08. |

| | -continued |
|---|---|
| min_frames | During a final pass through all the frames, if for a given face the number of occurrences is less than min_frames, the face is rejected. This is only likely to occur near the end of a sequence. min_frames is currently set to 5. |
| final_prediction_acceptance_ratio_threshold and min_frames2 | During a final pass through all the frames, if for a given tracked face the number of occurrences is less than min_frames2 AND the proportion of accepted Kalman predicted face positions exceeds the final_prediction_acceptance_ratio_threshold, the face is rejected. Again, this is only likely to occur near the end of a sequence. final_prediction_acceptance_ratio_threshold is currently set to 0.5 and min_frames2 is currently set to 10. |
| min_eye_spacing | Additionally, faces are now removed if they are tracked such that the eye spacing is decreased below a given minimum distance. This can happen if the Kalman filter falsely believes the eye distance is becoming smaller and there is no other evidence, e.g. face detection results, to correct this assumption. If uncorrected, the eye distance would eventually become zero. As an optional alternative, a minimum or lower limit eye separation can be forced, so that if the detected eye separation reduces to the minimum eye separation, the detection process continues to search for faces having that eye separation, but not a smaller eye separation. |

It is noted that the tracking process is not limited to tracking through a video sequence in a forward temporal direction. Assuming that the image data remain accessible (i.e. the process is not real-time, or the image data are buffered for temporary continued use), the entire tracking process could be carried out in a reverse temporal direction. Or, when a first face detection is made (often part-way through a video sequence) the tracking process could be initiated in both temporal directions. As a further option, the tracking process could be run in both temporal directions through a video sequence, with the results being combined so that (for example) a tracked face meeting the acceptance criteria is included as a valid result whichever direction the tracking took place.

Some further rules which may be applied in respect of face tracking will now be described.

Alternative/Additional Rules for Starting Off/Maintaining a Face Track

In the methods described above, a face track is started for every face detection that cannot be matched up with an existing track. This could lead to many false detections being erroneously tracked and persisting for several frames before finally being rejected by one of the existing rules (e.g. prediction_acceptance_ratio_threshold).

Also, the rules for rejecting a track (e.g. prediction_acceptance_ratio_threshold, detection_acceptance_ratio_threshold), are biased against tracking someone who turns their head to the side for a significant length of time. In reality, it is often useful to carry on tracking someone who does this.

The first part of the solution helps to prevent false detections from setting off erroneous tracks.

A face track is still started internally for every face detection that does not match an existing track. However, it is not output from the algorithm.

In order for this track to be maintained, the first f frames in the track must be face detections (i.e. of type D). If all of the first f frames are of type D then the track is maintained and face locations are output from the algorithm from frame f onwards. If all of the first n frames are not of type D, then the face track is terminated and no face locations are output for this track. f is typically set to 2, 3 or 5.

The second part of the solution allows faces in profile to be tracked for a long period, rather than having their tracks terminated due to a low detection_acceptance_ratio. prediction_acceptance_ratio_threshold and detection_acceptance_ratio_threshold are not turned on in this case. Instead, an option is to include the following criterion to maintain a face track:

g consecutive face detections are required every n frames to maintain the face track where g is typically set to a similar value to f, e.g. 1-5 frames and n corresponds to the maximum number of frames for which we wish to be able to track someone when they are turned away from the camera, e.g. 10 seconds (=250 or 300 frames depending on frame rate). This may also be combined with the prediction_acceptance_ratio_threshold and detection_acceptance_ratio_threshold rules. Alternatively, the prediction_acceptance_ratio_threshold and detection_acceptance_ratio_threshold may be applied on a rolling basis e.g. over only the last 30 frames, rather than since the beginning of the track.

Bad Colour Threshold Rule

In the methods described above, the skin colour of the face is only checked during skin colour tracking. This means that non-skin-coloured false detections may be tracked, or the face track may wander off into non-skin-coloured locations by using the predicted face position.

To address this, whatever the acceptance type of the face (detection, skin colour or Kalman prediction), its skin colour is checked. If its distance from skin colour exceeds a bad_colour_threshold, then the face track is terminated.

An efficient way to implement this is to use the distance from skin colour of each pixel calculated during skin colour tracking. If, this measure averaged over the face area (either over a mask shaped area, over an elliptical area or over the whole face window depending on which skin colour tracking method is being used), exceeds a fixed threshold, then the face track is terminated.

Validation with Area of Interest Map

In other methods described herein, an area of interest pre-processor is used to ascertain which areas of the image have non-face-like variance. This is repeated at every scale, and these areas are then omitted from face detection processing. However, it is still possible for a skin colour tracked or Kalman predicted face to move into a (non-face-like) low or high variance area of the image.

To address this, during variance pre-processing, the variance values (or gradient values) for the areas around existing face tracks are stored.

When the final decision on the face's next position is made (with any acceptance type, either face detection, skin colour or Kalman prediction) the position is validated against the stored variance (or gradient) values in the area of interest map. If the position is found to have very high or very low variance (or gradient), it is considered to be non-face-like and the face track is terminated. This avoids face tracks wandering onto low (or high) variance background areas of the image. Alternatively, the variance of the new face position is calculated afresh (useful if variance-pre-processing is not used).

Note that the variance measure used can either be traditional variance or the sum of differences of neighbouring pixels (gradient) or any other variance-type measure.

In the tracking system shown schematically in FIG. 22, three further features are included.

Shot boundary data 560 (from metadata associated with the image sequence under test; or metadata generated within the camera of FIG. 2) defines the limits of each contiguous "shot" within the image sequence. The Kalman filter is reset at shot boundaries, and is not allowed to carry a prediction over to a subsequent shot, as the prediction would be meaningless.

User metadata 542 and camera setting metadata 544 are supplied as inputs to the face detector 540. These may also be used in a non-tracking system. Examples of the camera setting metadata were described above. User metadata may include information such as:

type of programme (e.g. news, interview, drama)

script information such as specification of a "long shot", "medium close-up" etc (particular types of camera shot leading to an expected sub-range of face sizes), how many people involved in each shot (again leading to an expected sub-range of face sizes) and so on sports-related information—sports are often filmed from fixed camera positions using standard views and shots. By specifying these in the metadata, again a sub-range of face sizes can be derived The type of programme is relevant to the type of face which may be expected in the images or image sequence. For example, in a news programme, one would expect to see a single face for much of the image sequence, occupying an area of (say) 10% of the screen. The detection of faces at different scales can be weighted in response to this data, so that faces of about this size are given an enhanced probability. Another alternative or additional approach is that the search range is reduced, so that instead of searching for faces at all possible scales, only a subset of scales is searched. This can reduce the processing requirements of the face detection process. In a software-based system, the software can run more quickly and/or on a less powerful processor. In a hardware-based system (including for example an application-specific integrated circuit (ASIC) or field programmable gate array (FPGA) system) the hardware needs may be reduced.

The other types of user metadata mentioned above may also be applied in this way. The "expected face size" sub-ranges may be stored in a look-up table held in the memory 30, for example.

As regards camera metadata, for example the current focus and zoom settings of the lens 110, these can also assist the face detector by giving an initial indication of the expected image size of any faces that may be present in the foreground of the image. In this regard, it is noted that the focus and zoom settings between them define the expected separation between the camcorder 100 and a person being filmed, and also the magnification of the lens 110. From these two attributes, based upon an average face size, it is possible to calculate the expected size (in pixels) of a face in the resulting image data, leading again to a sub-range of sizes for search or a weighting of the expected face sizes.

Advantages of the Tracking Algorithm

The face tracking technique has three main benefits:

It allows missed faces to be filled in by using Kalman filtering and skin colour tracking in frames for which no face detection results are available. This increases the true acceptance rate across the image sequence.

It provides face linking: by successfully tracking a face, the algorithm automatically knows whether a face detected in a future frame belongs to the same person or a different person. Thus, scene metadata can easily be generated from this algorithm, comprising the number of faces in the scene, the frames for which they are present and providing a representative mugshot of each face.

False face detections tend to be rejected, as such detections tend not to carry forward between images.

The embodiments described above have related to a face detection system (involving training and detection phases) and possible uses for it in a camera-recorder and an editing system. It will be appreciated that there are many other possible uses of such techniques, for example (and not limited to) security surveillance systems, media handling in general (such as video tape recorder controllers), video conferencing systems and the like.

Variations on the Colour Mask Techniques

These variations may be applied individually or, where technically appropriate, in combination.

Variation 1: a default Gaussian skin colour model is used to calculate the colour distance value for every pixel in the image (to give a colour distance map). When a face is detected, its average distance from the default is calculated over a mask shaped area. When validating future colour-tracked faces, (or detected faces or Kalman predicted faces), the face track is terminated if the distance from the default colour model varies outside a given tolerance. This means (a) the same colour distance values can be used for all face tracks (there is no need for a different model for each face, since we use default colour model rather than seeding on face colour) and (b) if track wanders off face onto a different coloured background it is terminated, rather than persisting.

Variation 2: instead of a default colour model, a different colour model is used for each face, seeded on that face's colour when it is first detected. Then, when the colour distance map is calculated, different colour model parameters are used in different areas of the image, dependent on the position of each face in the previous frame. The colour distance values may be blended together as a weighted sum on areas in between two faces. This allows the colour tracking to be modelled more accurately on each face's actual colour without needing to calculate more than one colour distance value for each pixel position in the image.

Variation 3: instead of a default colour model, or different colour models for each face, a general colour model is seeded on the average colour of all detected faces from the previous frame.

Variation 4: when searching the colour distance map with a square head-sized window to find the minimum averaged distance from skin colour, areas inside the mask give a positive contribution and areas outside the mask give a negative contribution. This means that plain, skin coloured areas should have a net distance from skin colour of zero. It also means that the shape-matching property of the mask method is reinforced. In the method described above, only areas inside the face mask were used.

Variation 5: the colour distance map is first quantised to two levels so that each pixel is either skin colour (1) or non-skin colour (−1). This prevents the magnitude of the colour distance values from having an undue effect on the distance from skin colour calculation, i.e. when combined with variation 4 above, very non-skin coloured pixels outside the mask do not have an undue influence.

Variation 6: the skin colour mask is updated more gradually. A new mask is calculated as 90% of the previous frame's mask with only a 10% weighting of the current frame's mask. This helps to avoid the problems caused by temporary partial occlusions, e.g. hands passing briefly in front of the face. Also helps to avoid problem of people moving very slowly.

The skin colour tracking technique described earlier worked by matching the colour distance mask of the face in the previous frame to the colour distance map of the current frame. There are three aspects of this method which at least some of the variations aim to improve:

(i) In the case of partial occlusions (a hand in front of the face, for example), it is possible that the hand is tracked, rather than the face.
(ii) Because the faces are tracked on a coarse grid (according to the face size) it is possible for the colour distance map to slowly 'slip' off the face, if the face is moving slowly.
(iii) Because only skin colour like areas are considered it is possible for a good match to be found on a plain skin colour region.

Variation 6, in which the colour distance mask for the face is only slowly updated, addresses aspects (i) and (ii). As well as getting a good match for skin colour areas within the facemask, non face coloured areas are also considered in Variation 5, which addresses (iii).

In more detail, for each face a binary mask is calculated from the previous frame's colour distance map at the location of the face within this frame. Each element of the mask is either '1' if it is less than the average colour distance value for the entire mask (i.e. it is skin coloured), or else '0' (non-skin-coloured).

A search is conducted over the search window using the binary mask. At each point within the search window, a value is calculated by summing all the colour distance values where the mask is '1' and subtracting all the colour distance values where the mask is '0'. The best match is taken to be the position at which the mask gives the minimum summed colour distance value.

Figure 28:
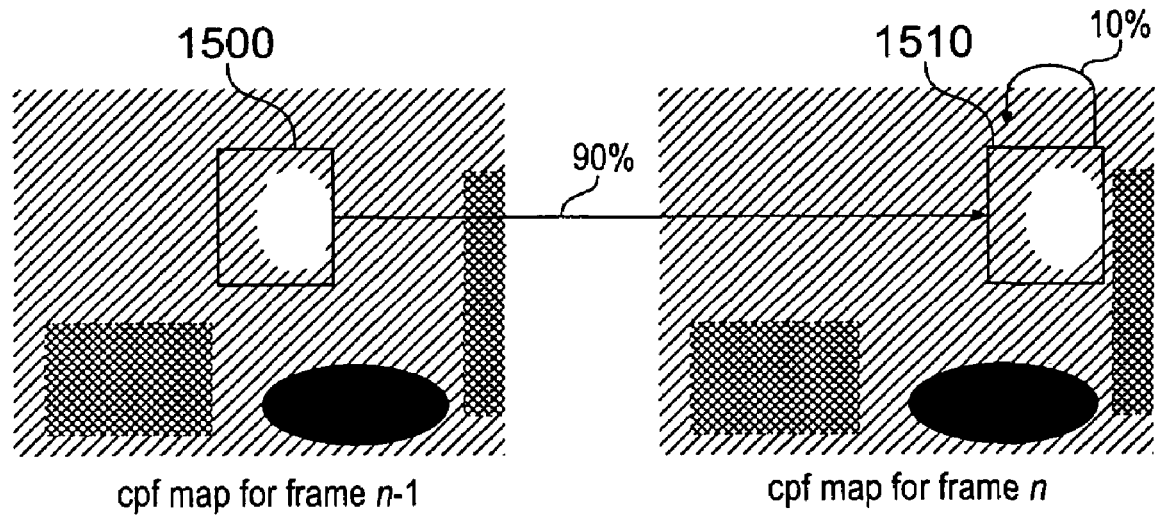
FIG. 28 schematically illustrates a colour map update process.

For each face in the image, with reference to FIG. 28, the current colour distance map (for frame n) is updated by summing 90% of the old colour distance map at the old face location 1500 with 10% of the new colour distance map at the new face location 1510.

This has the effect of slowly changing the colour distance mask for each face. Thus if the face is partially occluded the occluding object only changes the colour distance mask slightly, so the matching process is still likely to match the original face, rather than the occluding object.

An additional effect of this method is that a slowly moving face is still successfully tracked, even if the searching is only carried out over a coarse grid. The reason for this is apparent if the following scenario is considered:

Assume that searching takes place over a 4×4 grid (i.e. the searching cannot be more accurate than 4 pixels), using the earlier method. If the face moves 1 pixel the searching algorithm will find the face in the same (previous) location. Since the colour distance map was completely replaced with the new one, if the face continues to move at 1 pixel a frame, after 4 frames the face will still be found in the original location, even though it should have now moved 4 pixels—in other words, the mask has 'slipped' from the face.

If the method of Variation 6 is used, where the colour distance mask is slowly updated, after 4 frames the searching algorithm will still be using a colour distance map with some memory of where the face was 4 frames ago. This means that the searching algorithm can deduce that the face has really moved 4 pixels.

Further improvement in performance can be obtained by quantising the colour distance map to two levels when searching the map with the binary mask, as in Variation 5. Each pixel in the map is set to −1 if it is below the average colour distance value of the mask and to +1 if it is above the average colour distance value of the mask (the "average colour distance of the mask" refers to the average colour distance of the face window before it was quantised to '1's and '0's to form the mask).

Then, as before, a value is calculated at each point within the search window by summing all the colour distance values where the mask is '1' and subtracting all the colour distance values where the mask is '0'.

In summary, this means that each pixel location within the face window has the following contribution, based on the mask value and image colour distance value:

| | Colour distance map value <= average colour distance of mask [skin-coloured] | Colour distance map value > average colour distance of mask [non-skin-coloured] |
|---|---|---|
| Pixel in face window is inside mask (i.e. mask = 1) [skin coloured] | −1 | +1 |
| Pixel in face window is outside mask (i.e. mask = 0) [non-skin-coloured] | +1 | −1 |

At each position in the search window, these values are calculated and summed for a face-sized window. As before, the best match is taken as the pixel location where the minimum value is obtained, i.e. where the mask best matches the image.

This method prevents the magnitude of the colour distance values from having an undue effect on the distance from skin colour calculation so that very non-skin coloured pixels outside the mask do not have undue influence.

Face Tracking and Decimation

In a system using decimation, particularly temporal decimation as described above, it may be that for some frames there is not a definitive face detection result available at the end of processing that frame. In this case, skin colour tracking could be used in respect of frames for which the temporal decimation means that no face detection is available. The rules about the number of consecutive face detections required, and the like, would be appropriately relaxed. If spatial decimation means that a result is available in respect of only a part of an image, face tracking could be performed whenever a complete new result was obtained, or at each image, on the basis of the best information available at that time in respect of the whole image.

Gradient Pre-Processing

Figure 29A:
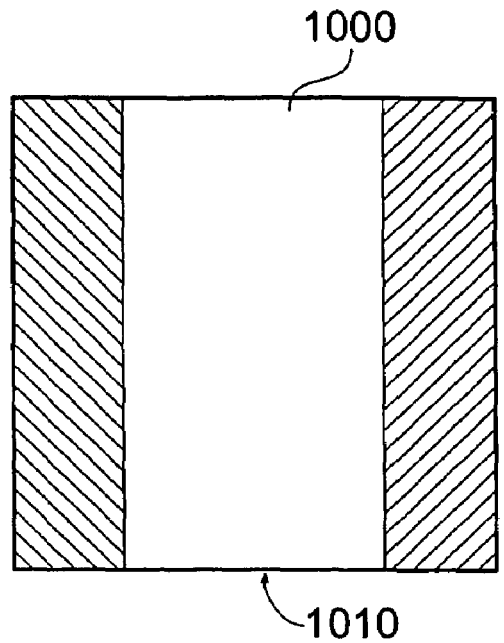
FIGS. 29a to 29c schematically illustrate a gradient (variance) pre-processing technique.
Figure 29B:
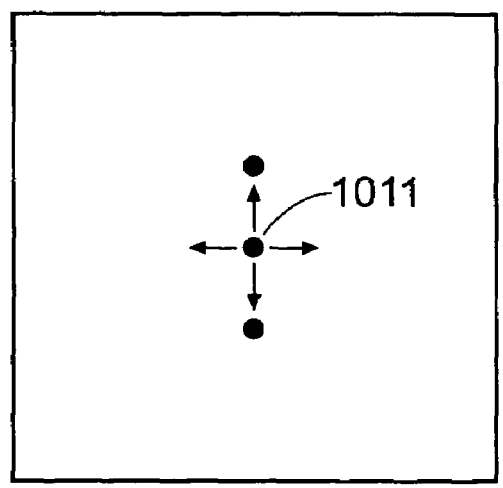
Figure 29C:
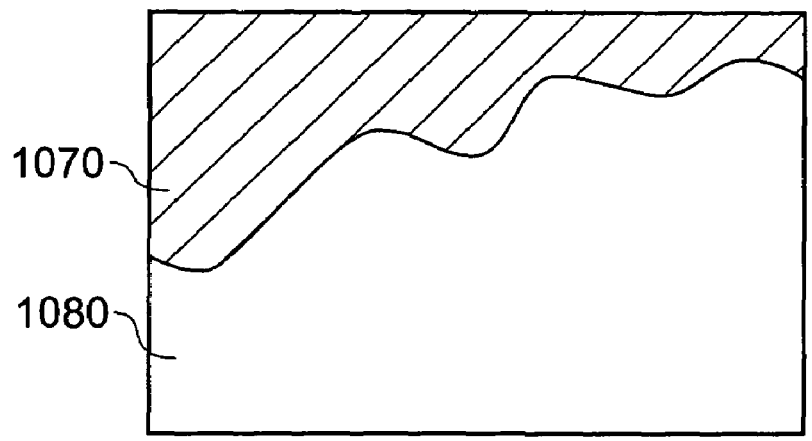

FIGS. 29a to 29c schematically illustrate a gradient pre-processing technique.

It has been noted that image windows showing little pixel variation can tend to be detected as faces by a face detection arrangement based on eigenfaces or eigenblocks. Therefore, a pre-processing step is proposed to remove areas of little pixel variation from the face detection process. In the case of a multiple scale system (see above) the pre-processing step can be carried out at each scale.

The basic process is that a "gradient test" is applied to each possible window position across the whole image. A predetermined pixel position for each window position, such as the pixel at or nearest the centre of that window position, is flagged or labelled in dependence on the results of the test applied to that window. If the test shows that a window has little pixel variation, that window position is not used in the face detection process.

A first step is illustrated in FIG. 29a. This shows a window at an arbitrary window position in the image. As mentioned above, the pre-processing is repeated at each possible window position. Referring to FIG. 29a, although the gradient pre-processing could be applied to the whole window, it has been found that better results are obtained if the pre-processing is applied to a central area 1000 of the test window 1010.

Referring to FIG. 29b, a gradient-based measure is derived from the window (or from the central area of the window as shown in FIG. 29a), which is the average of the absolute differences between all adjacent pixels 1011 in both the horizontal and vertical directions, taken over the window. Each window centre position is labelled with this gradient-based measure to produce a gradient "map" of the image. The resulting gradient map is then compared with a threshold gradient value. Any window positions for which the gradient-based measure lies below the threshold gradient value are excluded from the face detection process in respect of that image.

Alternative gradient-based measures could be used, such as the pixel variance or the mean absolute pixel difference from a mean pixel value.

The gradient-based measure is preferably carried out in respect of pixel luminance values, but could of course be applied to other image components of a colour image.

FIG. 29c schematically illustrates a gradient map derived from an example image. Here a lower gradient area 1070 (shown shaded) is excluded from face detection, and only a higher gradient area 1080 is used. The embodiments described above have related to a face detection system (involving training and detection phases) and possible uses for it in a camera-recorder and an editing system. It will be appreciated that there are many other possible uses of such techniques, for example (and not limited to) security surveillance systems, media handling in general (such as video tape recorder controllers), video conferencing systems, IP cameras, digital stills cameras and the like.

In other embodiments, window positions having high pixel differences can also be flagged or labelled, and are also excluded from the face detection process. A "high" pixel difference means that the measure described above with respect to FIG. 29b exceeds an upper threshold value.

So, a gradient map is produced as described above. Any positions for which the gradient measure is lower than the (first) threshold gradient value mentioned earlier are excluded from face detection processing, as are any positions for which the gradient measure is higher than the upper threshold value.

It was mentioned above that the "lower threshold" processing is preferably applied to a central part 1000 of the test window 1010. The same can apply to the "upper threshold" processing. This would mean that only a single gradient measure needs to be derived in respect of each window position. Alternatively, if the whole window is used in respect of the lower threshold test, the whole window can similarly be used in respect of the upper threshold test. Again, only a single gradient measure needs to be derived for each window position. Of course, however, it is possible to use two different arrangements, so that (for example) a central part 1000 of the test window 1010 is used to derive the gradient measure for the lower threshold test, but the full test window is used in respect of the upper threshold test.

A further criterion for rejecting a face track, mentioned earlier, is that its variance or gradient measure is very low or very high.

In this technique a tracked face position is validated by variance from area of interest map. Only a face-sized area of the map at the detected scale is stored per face for the next iteration of tracking.

Despite the gradient pre-processing described above, it is still possible for a skin colour tracked or Kalman predicted face to move into a (non-face-like) low or high variance area of the image. So, during gradient pre-processing, the variance values (or gradient values) for the areas around existing face tracks are stored.

When the final decision on the face's next position is made (with any acceptance type, either face detection, skin colour or Kalman prediction) the position is validated against the stored variance (or gradient) values in the area of interest map. If the position is found to have very high or very low variance (or gradient), it is considered to be non-face-like and the face track is terminated. This prevents face tracks from wandering onto low (or high) variance background areas of the image.

Alternatively, even if gradient pre-processing is not used, the variance of the new face position can be calculated afresh. In either case the variance measure used can either be traditional variance or the sum of differences of neighbouring pixels (gradient) or any other variance-type measure.

Combining Variance Pre-Processing and Change Detection

As mentioned above, with the change detection technique, one or more rectangular bounding boxes are placed around the areas of detected motion (or at least, so as to exclude areas which have no detected motion). These boxes are then rescaled to all the scales at which face detection is to be carried out.

The area of interest decision, which is to say a decision as to which areas are to be subjected to face detection, is based on the outputs from the variance pre-processing and change detection processes.

Only areas of the image that:
(i) have been selected as candidate face areas during variance pre-processing and (ii) have been labelled as areas of detected motion during change detection need to be processed in the face detection algorithm.

Therefore, the area of interest decision logic combines the areas of interest from the variance pre-processing and change detection modules to produce a final area of interest. These are constrained by one or more rectangular bounding boxes at each scale or (without limitation to bounding boxes) a multi-scale "area of interest" map, with each pixel position being labelled as an area of interest or not.

It is also useful for the face detection algorithm to know which of the areas that are not processed correspond to "lack of change detected" so that the face detection results from the previous frame can be repeated for these areas. Therefore, this information is also passed on to face detection.

It will be appreciated that the embodiments of the invention described above may of course be implemented, at least in part, using software-controlled data processing apparatus. For example, one or more of the components schematically illustrated or described above may be implemented as a software-controlled general purpose data processing device or a bespoke program controlled data processing device such as an application specific integrated circuit, a field programmable gate array or the like. It will be appreciated that a computer program providing such software or program control and a storage, transmission or other providing medium by which such a computer program is stored are envisaged as aspects of the present invention.

The list of references and appendices follow. For the avoidance of doubt, it is noted that the list and the appendices form a part of the present description.

REFERENCES

1. H. Schneiderman and T. Kanade, "A statistical model for 3D object detection applied to faces and cars," IEEE Conference on Computer Vision and Pattern Detection, 2000.
2. H. Schneiderman and T. Kanade, "Probabilistic modelling of local appearance and spatial relationships for object detection," IEEE Conference on Computer Vision and Pattern Detection, 1998.
3. H. Schneiderman, "A statistical approach to 3D object detection applied to faces and cars," PhD thesis, Robotics Institute, Carnegie Mellon University, 2000.
4. E. Hjelmas and B. K. Low, "Face Detection: A Survey," Computer Vision and Image Understanding, no.83, pp. 236-274, 2001.
5. M.-H. Yang, D. Kriegman and N. Ahuja, "Detecting Faces in Images: A Survey," IEEE Trans. on Pattern Analysis and Machine Intelligence, vol.24, no.1, pp. 34-58, January 2002.

Appendix A: Training Face Sets

One database consists of many thousand images of subjects standing in front of an indoor background. Another training database used in experimental implementations of the above techniques consists of more than ten thousand eight-bit greyscale images of human heads with views ranging from frontal to left and right profiles. The skilled man will of course understand that various different training sets could be used, optionally being profiled to reflect facial characteristics of a local population.

Appendix B—Eigenblocks

In the eigenface approach to face detection and recognition (References 4 and 5), each m-by-n face image is reordered so that it is represented by a vector of length mn. Each image can then be thought of as a point in mn-dimensional space. A set of images maps to a collection of points in this large space.

Face images, being similar in overall configuration, are not randomly distributed in this mn-dimensional image space and therefore they can be described by a relatively low dimensional subspace. Using principal component analysis (PCA), the vectors that best account for the distribution of face images within the entire image space can be found. PCA involves determining the principal eigenvectors of the covariance matrix corresponding to the original face images. These vectors define the subspace of face images, often referred to as the face space. Each vector represents an m-by-n image and is a linear combination of the original face images. Because the vectors are the eigenvectors of the covariance matrix corresponding to the original face images, and because they are face-like in appearance, they are often referred to as eigenfaces [4].

When an unknown image is presented, it is projected into the face space. In this way, it is expressed in terms of a weighted sum of eigenfaces.

In the present embodiments, a closely related approach is used, to generate and apply so-called "eigenblocks" or eigenvectors relating to blocks of the face image. A grid of blocks is applied to the face image (in the training set) or the test window (during the detection phase) and an eigenvector-based process, very similar to the eigenface process, is applied at each block position. (Or in an alternative embodiment to save on data processing, the process is applied once to the group of block positions, producing one set of eigenblocks for use at any block position). The skilled man will understand that some blocks, such as a central block often representing a nose feature of the image, may be more significant in deciding whether a face is present.

Calculating Eigenblocks

The calculation of eigenblocks involves the following steps:

(1). A training set of $N_T$ images is used. These are divided into image blocks each of size m×n. So, for each block position a set of image blocks, one from that position in each image, is obtained:

$$\{I_o^t\}_{t=1}^{N_T}.$$

(2). A normalised training set of blocks $$\{I^t\}_{t=1}^{N_T},$$

is calculated as follows:

Each image block, $I_o^t$, from the original training set is normalised to have a mean of zero and an L2-norm of 1, to produce a respective normalised image block, $I^t$. For each image block, $I_o^t$, t=1 ... $N_T$:

$$I^t = \frac{I_o^t - \text{mean\_}I_o^t}{\|I_o^t - \text{mean\_}I_o^t\|} \text{ where mean\_}I_o^t = \frac{1}{mn}\sum_{i=1}^{m}\sum_{j=1}^{n} I_o^t[i,j] \text{ and}$$

-continued $$\|I_o^t - \text{mean}\_I_o^t\| = \sqrt{\sum_{i=1}^{m}\sum_{j=1}^{n}(I_o^t[i,j] - \text{mean}\_I_o^t)^2}$$

(i.e. the *L2*-norm of $(I_o^t - \text{mean}\_I_o^t)$)

(3). A training set of vectors $$\{x^t\}_{t=1}^{N_T}$$

is formed by lexicographic reordering of the pixel elements of each image block, $I^t$. i.e. Each m-by-n image block, $I^t$, is reordered into a vector, $x^t$, of length N=nm.

(4). The set of deviation vectors, $$D = \{x^t\}_{t=1}^{N_T},$$

is calculated. D has N rows and $N_T$ columns.

(5). The covariance matrix, Σ, is calculated:

Σ=DD$^T$

Σ is a symmetric matrix of size N×N.

(7). The whole set of eigenvectors, P, and eigenvalues, $\lambda_i$, i=1, ..., N, of the covariance matrix, Σ, are given by solving:

Λ=P$^T$ΣP

Here, Λ is an N×N diagonal matrix with the eigenvalues, $\lambda_i$, along its diagonal (in order of magnitude) and P is an N×N matrix containing the set of N eigenvectors, each of length N. This decomposition is also known as a Karhunen-Loeve Transform (KLT).

The eigenvectors can be thought of as a set of features that together characterise the variation between the blocks of the face images. They form an orthogonal basis by which any image block can be represented, i.e. in principle any image can be represented without error by a weighted sum of the eigenvectors.

If the number of data points in the image space (the number of training images) is less than the dimension of the space ($N_T$<N), then there will only be $N_T$ meaningful eigenvectors. The remaining eigenvectors will have associated eigenvalues of zero. Hence, because typically $N_T$<N, all eigenvalues for which i>$N_T$ will be zero.

Additionally, because the image blocks in the training set are similar in overall configuration (they are all derived from faces), only some of the remaining eigenvectors will characterise very strong differences between the image blocks. These are the eigenvectors with the largest associated eigenvalues. The other remaining eigenvectors with smaller associated eigenvalues do not characterise such large differences and therefore they are not as useful for detecting or distinguishing between faces.

Therefore, in PCA, only the M principal eigenvectors with the largest magnitude eigenvalues are considered, where M<$N_T$ i.e. a partial KLT is performed. In short, PCA extracts a lower-dimensional subspace of the KLT basis corresponding to the largest magnitude eigenvalues.

Because the principal components describe the strongest variations between the face images, in appearance they may resemble parts of face blocks and are referred to here as eigenblocks. However, the term eigenvectors could equally be used.

Face Detection Using Eigenblocks

The similarity of an unknown image to a face, or its faceness, can be measured by determining how well the image is represented by the face space. This process is carried out on a block-by-block basis, using the same grid of blocks as that used in the training process.

The first stage of this process involves projecting the image into the face space.

Projection of an Image into Face Space

Before projecting an image into face space, much the same pre-processing steps are performed on the image as were performed on the training set:

(1). A test image block of size m×n is obtained: $I_o$.

(2). The original test image block, $I_o$ is normalised to have a mean of zero and an L2-norm of 1, to produce the normalised test image block, I:

$$I = \frac{I_o - \text{mean}\_I_o}{\|I_o - \text{mean}\_I_o\|} \text{ where mean}\_I_o = \frac{1}{mn}\sum_{i=1}^{m}\sum_{j=1}^{n}I_o[i,j] \text{ and}$$

$$\|I_o - \text{mean}\_I_o\| = \sqrt{\sum_{i=1}^{m}\sum_{j=1}^{n}(I_o[i,j] - \text{mean}\_I_o)^2}$$

(i.e. the *L2*-norm of $(I_o - \text{mean}\_I_o)$)

(3). The deviation vectors are calculated by lexicographic reordering of the pixel elements of the image. The image is reordered into a deviation vector, $x^t$, of length N=nm.

After these pre-processing steps, the deviation vector, x, is projected into face space using the following simple step:

(4). The projection into face space involves transforming the deviation vector, x, into its eigenblock components. This involves a simple multiplication by the M principal eigenvectors (the eigenblocks), $P_i$, i=1, ..., M. Each weight $y_i$ is obtained as follows:

$y_i = P_i^T x$ where $P_i$ is the $i^{th}$ eigenvector.

The weights $y_i$, i=1, ..., M, describe the contribution of each eigenblock in representing the input face block.

Blocks of similar appearance will have similar sets of weights while blocks of different appearance will have different sets of weights. Therefore, the weights are used here as feature vectors for classifying face blocks during face detection.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. Object detection apparatus configured to detect objects in a test image, said apparatus comprising:
   a comparator to compare blocks of a test window of said image with reference data indicative of the presence of an object to generate index figures indicative of a degree of similarity between a region and said reference data;

storage to store probability data corresponding to possible values of said index figure and said block position;

logic operable, in respect of a current block, to access a probability value from said storage in dependence on a position of the current block within said test window and said index figure generated in respect of the current block; and a combiner to combine said probability values corresponding to blocks in a test window to generate a result indicative of the probability of the test window including an object, wherein said probability values in said storage are ordered in the storage by block position, then by index figure.

2. Apparatus according to claim 1, in which said accessing logic is further operable to access two or more probability values in respect of a position of a current block and index figure, said two or more probability values relating to different object orientations.

3. Apparatus according to claim 2, in which said combiner is operable to combine probability values relating to a individual object orientations to generate a respective result for each object orientation.

4. Apparatus according to claim 2, in which said probability values in said storage are ordered by object orientation, then by block position, then by index figure.

5. Apparatus according to claim 2, in which said object orientations comprise at least a frontal orientation and an object directed to one side.

6. Apparatus according to claim 5, in which said object orientations comprise at least a frontal orientation, an object directed to one side and an object directed to another side.

7. Apparatus according to claim 5, in which probability values relating to said frontal orientation are stored in said storage to a higher resolution than probability values relating to other object orientations.

8. Apparatus according to claim 7, in which probability values relating to said frontal orientation are stored in said storage with twice the resolution of probability values relating to other object orientations.

9. Apparatus according to claim 1, in which said comparator is operable to project said blocks onto one or more image eigenvectors.

10. Apparatus according to claim 1, in which said accessing logic further comprising:

a cache store for caching recently accessed probability values and probability values near, in the storing order, to the probability values that were recently accessed 11. Apparatus according to claim 1, in which said objects are faces.

12. Video conferencing apparatus comprising apparatus according to claim 1.

13. Surveillance apparatus comprising apparatus according to claim 1.

14. A camera arrangement comprising apparatus according to claim 1.

15. A method of detecting objects in a test image, said method comprising the steps of:

comparing blocks of a test window of said image with reference data indicative of the presence of an object to generate index figures indicative of a degree of similarity between a region and said reference data;

storing probability data corresponding to possible values of said index figure and said block position;

accessing a probability value from the stored probability data in dependence on a position of a current block within said test window and the index figure generated in respect of the current block; and combining said probability values corresponding to blocks in a test window to generate a result indicative of the probability of the test window eentainiiig-including an object;

wherein said stored probability values are ordered in a storage by block position, then by index figure.

16. The method according to claim 15, wherein the probability values that are stored by said storing are ordered by object orientation, then by block position, then by index figure.

17. The method according to claim 15 further comprising the step of: caching recently accessed probability values and probability values near, in the storing order, to the probability values that were recently accessed.

18. A computer-readable medium encoded with computer code instructions that are configured, when executed by a computer, to perform a method including the steps of:

comparing blocks of a test window of said image with reference data indicative of the presence of an object to generate index figures indicative of a degree of similarity between a region and said reference data;

storing probability data corresponding to possible values of said index figure and said block position;

accessing a probability value from the stored probability data in dependence on a position of a current block within said test window and the index figure generated in respect of the current block;

combining said probability values corresponding to blocks in a test window to generate a result indicative of the probability of the test window including an object, wherein said stored probability values are ordered in a storage by block position, then by index figure.

19. The computer-readable medium according to claim 18, wherein the probability values that are stored by said storing are ordered by object orientation, then by block position, then by index figure.

20. The computer-readable medium according to claim 18, the method further comprising the step of:

caching recently accessed probability values and probability values near, in the storing order, to the probability values that were recently accessed.

* * * * *